(12) United States Patent
Marinier et al.

(10) Patent No.: US 8,503,423 B2
(45) Date of Patent: Aug. 6, 2013

(54) METHOD AND APPARATUS FOR VERSATILE MAC MULTIPLEXING IN EVOLVED HSPA

(75) Inventors: Paul Marinier, Brossard (CA); Diana Pani, Montreal (CA); Stephen E. Terry, Northport, NY (US); Sudheer A. Grandhi, Mamaroneck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 389 days.

(21) Appl. No.: 12/024,900

(22) Filed: Feb. 1, 2008

(65) Prior Publication Data

US 2008/0186946 A1 Aug. 7, 2008

Related U.S. Application Data

(60) Provisional application No. 61/019,129, filed on Jan. 4, 2008, provisional application No. 60/912,063, filed on Apr. 16, 2007, provisional application No. 60/893,298, filed on Mar. 6, 2007, provisional application No. 60/887,957, filed on Feb. 2, 2007.

(51) Int. Cl.
*H04J 3/24* (2006.01)

(52) U.S. Cl.
USPC .................... 370/349; 370/469; 370/474

(58) Field of Classification Search
USPC .............. 370/349, 469, 473, 474, 394, 329
See application file for complete search history.

(56) References Cited

U.S. PATENT DOCUMENTS

| | | | |
|---|---|---|---|
| 5,213,605 A | 5/1993 | Rueb et al. | |
| 7,068,898 B2 | 6/2006 | Buretea et al. | |
| 7,551,596 B2 * | 6/2009 | Kim et al. | 370/349 |
| 2003/0007480 A1 * | 1/2003 | Kim et al. | 370/349 |
| 2003/0095519 A1 * | 5/2003 | Kuo et al. | 370/338 |
| 2004/0027999 A1 * | 2/2004 | Casaccia et al. | 370/312 |
| 2004/0156330 A1 | 8/2004 | Yi et al. | |
| 2005/0089004 A1 * | 4/2005 | Casaccia et al. | 370/347 |
| 2005/0213605 A1 * | 9/2005 | Kim et al. | 370/466 |
| 2005/0249138 A1 * | 11/2005 | Heo et al. | 370/311 |
| 2005/0265390 A1 * | 12/2005 | Lee et al. | 370/469 |
| 2006/0164981 A1 * | 7/2006 | Olsson et al. | 370/229 |
| 2008/0037474 A1 * | 2/2008 | Niwano | 370/335 |
| 2008/0089285 A1 * | 4/2008 | Pirskanen et al. | 370/329 |

FOREIGN PATENT DOCUMENTS

| | | |
|---|---|---|
| EP | 1 168 759 | 1/2002 |
| EP | 1 566 925 | 8/2005 |
| EP | 1 566 954 | 8/2005 |
| EP | 1748593 A1 | 1/2007 |

(Continued)

OTHER PUBLICATIONS

Third Generation Partnership Project, "Technical Specification Group Radio Access Network; HSPA Evolution (FDD); (Release 7)," 3GPP TR 25.999 V1.0.0 (Nov. 2006).

(Continued)

*Primary Examiner* — Hassan Phillips
*Assistant Examiner* — Saba Tsegaye
(74) *Attorney, Agent, or Firm* — Condo Roccia LLP

(57) ABSTRACT

Methods and apparatuses for versatile medium access control (MAC) multiplexing in evolved HSPA are disclosed. More particularly, methods for downlink optimization of the enhanced high speed MAC (MAC-ehs) entity and uplink optimization of the MAC-i/is entity are disclosed. Apparatuses for using the optimized downlink and uplink MAC entities are also disclosed.

17 Claims, 13 Drawing Sheets

FOREIGN PATENT DOCUMENTS

| RU | 2280951 C2 | 7/2006 |
|---|---|---|
| WO | WO 00/13426 A2 | 3/2000 |
| WO | 2005/125125 | 12/2005 |
| WO | WO 2008/097512 | 8/2008 |

OTHER PUBLICATIONS

Third Generation Partnership Project, "Technical Specification Group Radio Access Network; High Speed Packet Access (HSPA) Evolution; Frequency Division Duplex (FDD) (Release 7)," 3GPP TR 25.999 V7.0.1 (Dec. 2007).

Third Generation Partnership Project, "Technical Specification Group Radio Access Network; Medium Access Control (MAC) protocol specification (Release 7)," 3GPP TS 25.321 V7.0.0 (Mar. 2006).

Third Generation Partnership Project, "Technical Specification Group Radio Access Network; Medium Access Control (MAC) protocol specification (Release 7)," 3GPP TS 25.231 V7.3.0 (Dec. 2006).

Third Generation Partnership Project, "Technical Specification Group Radio Access Network; Medium Access Control (MAC) protocol specification (Release 7)," 3GPP TS 25.321 V7.4.0 (Mar. 2007).

Third Generation Partnership Project, "Technical Specification Group Radio Access Network; Medium Access Control (MAC) protocol specification (Release 7)," 3GPP TS 25.321 V7.5.0 (Jun. 2007).

Third Generation Partnership Project, "Technical Specification Group Radio Access Network; Medium Access Control (MAC) protocol specification (Release 7)," 3GPP TS 25.321 V7.7.0 (Dec. 2007).

Third Generation Partnership Project, "Technical Specification Group Radio Access Network; Medium Access Control (MAC) protocol specification (Release 8)," 3GPP TS 25.321 V8.0.0 (Dec. 2007).

Rapporteur, Nokia, Juho Pirskanen "Enhanced CELL_FACH state in FDD"; TSG-RAN meeting #35, Lemesos, Cyprus; Mar. 6-9, 2007; RP-070035.

Ericsson "Improved L2 support for high data rates"; TSG-RAN meeting #35, Lemesos, Cyprus; Mar. 6-9, 2007; RP-070049.

Change Request; 25.321 V7.3.0; 3GPP TSG-RAN WG2 Meeting #56bis; St. Louis, Missouri, USA; Feb. 12-16, 2007; R2-071586.

Change Request; 25.321 V7.3.0; 3GPP TSG-RAN2 Meeting #57; St. Louis, Missouri, USA; Feb. 12-16, 2007; R2-071061.

Change Request 25.321 V7.3.0; 3GPP TSG-RAN2 Meeting #57; St. Louis, Missouri, USA; Feb. 12-16, 2007; R2-070810.

Change Request 0318; 25.321 Rev. 3 V7.4.0; 3GPP TSG-RAN WG2 Meeting #58; Kobe, Japan, USA; May 7-11, 2007; R2-072258.

Change Request 0351; 25.321 Rev. 1 V7.5.0; 3GPP TSG-RAN WG2#59; Athens, Greece; Aug. 20-24, 2007; R2-073834.

3rd Generation Partnership Project (3GPP), TS 25.212 V7.3.0, 3rd Generation Partnership Project; Technical Specification Group Radio Access Network; Multiplexing and channel coding (FDD) (Release 7), Dec. 2006, 84 pages.

Alcatel Shanghai Bell, et al., Introduction of multi-frequency operation for 1.28Mcps TDD, 3GPP TSG-RAN2 Meeting #59 R2-073649, 3GPP, Aug. 24, 2007, pp. 1-16, URL, ftp://ftp.3gpp.org/tsg_ran/WG2_RL2/TSGR2_59/Docs/R2-073649.zip.

Ericsson, Summary of MAC-ehs header and list of open issues, 3GPP TSG-RAN WG2 # 57bis Draft Tdoc R2-071587, 3GPP, Mar. 30, 2007, pp. 1-2, URL, ftp://ftp.3gpp.org/tsg_ran/WG2_RL2/TSGR2_57bis/Documents/R2-071587.zip.

3rd Generation Partnership Project (3GPP), R2-070027, "MAC enhancements in HSPA evolution", ZTE, 3GPP TSG RAN WG2, #56 Bis, Sorrento, Italy, Jan. 15-19, 2007, 3 pages.

* cited by examiner

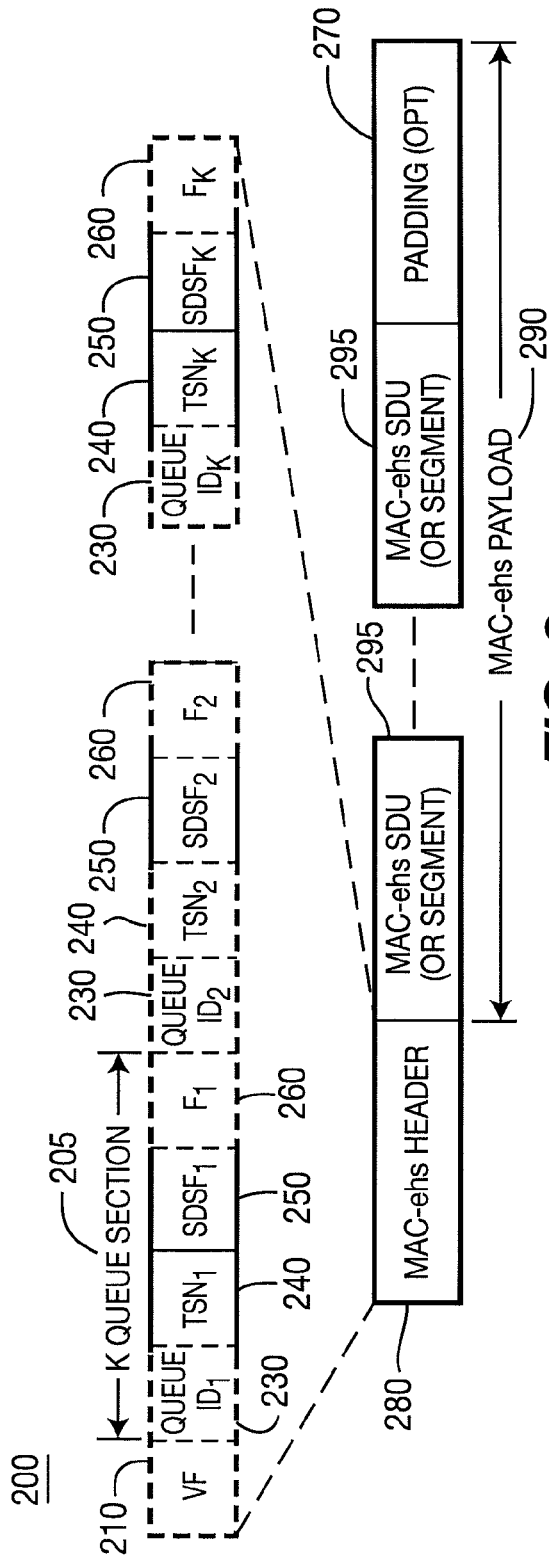
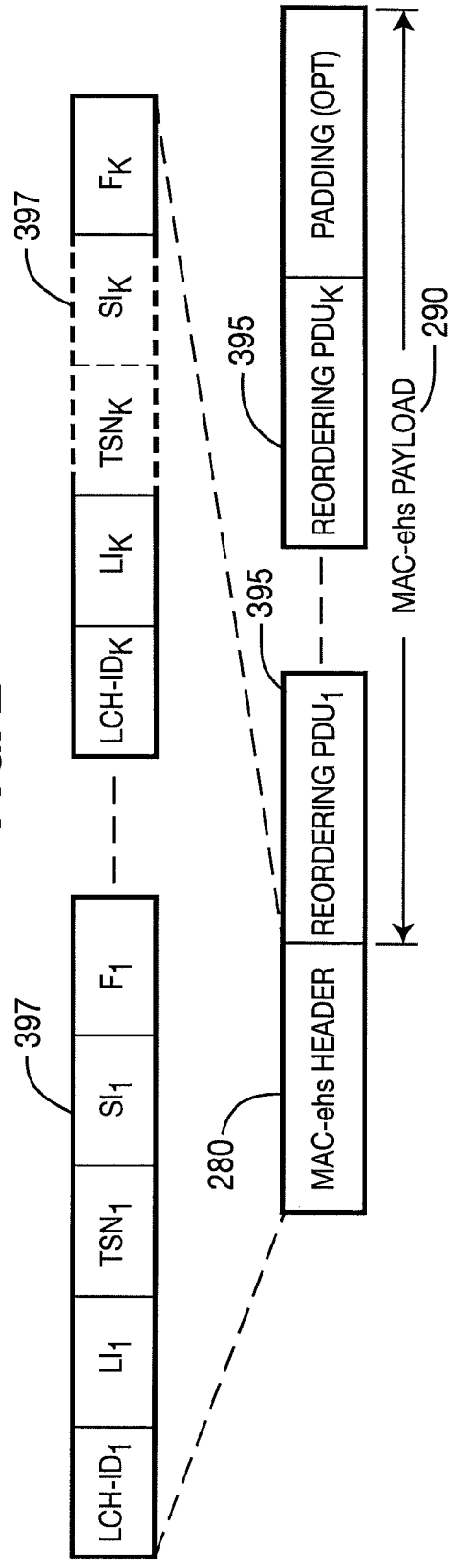

METHOD AND APPARATUS FOR VERSATILE MAC MULTIPLEXING IN EVOLVED HSPA

CROSS REFERENCE TO RELATED APPLICATIONS

This application claims the benefit of U.S. provisional application Nos. 60/887,957, filed Feb. 2, 2007, 60/893,298, filed Mar. 6, 2007, 60/912,063, filed Apr. 16, 2007, and 61/019,129, filed Jan. 4, 2008, which are incorporated by reference as if fully set forth.

BACKGROUND

Communications standards are developed in order to provide global connectivity for wireless systems and to achieve performance goals in terms of, for example, throughput, latency and coverage. One current standard in widespread use, called high speed packed access (HSPA), was developed as part of Third Generation (3G) Radio Systems, and is maintained by the Third Generation Partnership Project (3GPP).

High-Speed Packet Access (HSPA) is a collection of mobile telephony protocols that extend and improve the performance of existing Universal Mobile Telecommunications System (UMTS) protocols. High Speed Downlink Packet Access (HSDPA) and High Speed Uplink Packet Access (HSUPA) provide increased performance by using improved modulation schemes and by refining the protocols by which handsets and base stations communicate.

HSPA provides improved theoretical downlink (DL) performance of up to 14.4 Mbit/s and improved theoretical uplink (UL) performance of up to 5.76 Mbit/s. Existing deployments provide up to 7.2 Mbit/s in the DL and up to 384 kbit/s in the UL. Evolved HSPA is defined in 3GPP Release 7. It introduces simpler architecture for the mobile network by bypassing most of the legacy equipment and enhancing radio data rates.

Above the physical layer in a 3GPP system, a Medium Access Control (MAC) layer may be divided into several entities. A new MAC entity, MAC enhanced high speed (MAC-ehs), has been introduced and optimized for HSPA in the DL. The MAC-ehs entity can be used alternatively to MAC high speed (MAC-hs). In the UL a new MAC entity, improved MAC (MAC-i/is) has been introduced and optimized for HSPA. The MAC-i/is entity can be used alternatively to MAC-e/es. The MAC-ehs and/or MAC-i/is entity is configured by higher layers which are configured to handle the data transmitted on the High Speed Downlink Shared Channel (HS-DSCH) and/or Enhanced Uplink Channel (E-DCH) and manage the physical resources allocated to HS-DSCH.

The MAC-ehs entity allows the support of flexible radio link control (RLC) protocol data unit (PDU) sizes as well as MAC segmentation and reassembly. Unlike MAC-hs for HSDPA, MAC-ehs allows the multiplexing of data from several priority queues within one transmission time interval (TTI) of 2 ms.

The scheduling/priority handling function is responsible for the scheduling decisions. For each TTI of 2 ms, it is decided whether single or dual stream transmission is used. New transmissions or retransmissions are sent according to the acknowlegdement/negative acknowledgement (ACK/NACK) UL feedback, and new transmissions can be initiated at any time. While in the CELL_FACH, CELL_PCH, and URA_PCH states, the MAC-ehs can additionally perform retransmissions on HS-DSCH without relying on uplink signaling.

Reordering on the receiver side is based on priority queues. Transmission sequence numbers (TSN) are assigned within each reordering queue to enable reordering. On the receiver side, the MAC-ehs SDU, or segment thereof, is assigned to the correct priority queue based on the logical channel identifier.

The MAC-ehs SDUs can be segmented on the transmitter side and are reassembled on the receiver side. At the MAC layer, a set of logical channels is mapped to a transport channel. Two types of transport channels include, a "common" transport channel (MAC-c) which can be shared by multiple WTRUs, and a "dedicated" transport channel (MAC-d) which is allocated to a single WTRU. A MAC-ehs SDU is either a MAC-c PDU or MAC-d PDU. The MAC-ehs SDUs included in a MAC-ehs PDU can have different sizes and different priorities and can belong to different MAC-d or MAC-c flows.

The typical baseline of the MAC-ehs header results in fairly low overhead when the MAC-ehs multiplexes logical channels that are used by Release 7 RLC acknowledge mode (AM) instances configured with a flexible RLC PDU size. This is due to the size of a MAC SDU being significantly larger than the total size of the different fields of the header.

However, there are situations where the typical baseline would result in an undesirable level of overhead. For example, a logical channel is used by an RLC AM instance configured with a fixed RLC PDU size, or to a Release 6 RLC AM instance. The latter instance may result from the possibility of enabling handover from a Release 6 base station to a 3GPP Release 7 base station without resetting the RLC and keeping the RLC entity configured to operate with fixed RLC PDUs. In another example, the MAC-ehs PDU size possible with current channel conditions is small and contains a few (e.g., 2) segments of SDUs. In this example, the header may constitute a significant overhead.

Typical signaling requirements to support MAC-ehs functionalities are inefficient. It would be desirable to reduce the amount of signaling required to support MAC-ehs PDU functionalities. One possibility to reduce signaling would be to perform multiplexing/de-multiplexing of SDUs of different sizes, from different logical channels and priority queues in a single MAC-ehs PDU at the base station. Another possibility would be to perform multiplexing/de-multiplexing of SDUs of different sizes and belonging to different logical channels. Finally, concatenation/disassembly and segmentation/reassembly of MAC-ehs SDUs would be desirable.

Table 1 shows encoding of the segmentation indication (SI) field, when the segmentation indication is defined per priority queue. The meaning of the field may cause confusion at the WTRU side when padding is present at the end of the MAC-ehs header after the last segment of an SDU. In this case, the segmentation indication as per the indicated encoding would need to be "11." However, the WTRU could interpret this as meaning that the SDU is not complete and insert it in a reassembly buffer. It would be desirable to modify the encoding of this field to avoid this confusion.

TABLE 1

| SI Field | Segmentation indication |
| --- | --- |
| 00 | The first MAC-hs SDU of the addressed set of MAC-hs SDUs is a complete MAC-d PDU. The last MAC-hs SDU of the addressed set of MAC-hs SDUs is a complete MAC-d PDU. |
| 01 | The first MAC-hs SDU of the addressed set of MAC-hs SDUs is a segment of a MAC-d PDU. The last MAC-hs SDU of the addressed set of MAC-hs SDUs is a complete MAC-d PDU. |

TABLE 1-continued

| SI Field | Segmentation indication |
|---|---|
| 10 | The first MAC-hs SDU of the addressed set of MAC-hs SDUs is a complete MAC-d PDU. The last MAC-hs SDU of the addressed set of MAC-hs SDUs is a segment of a MAC-d PDU. |
| 11 | The first MAC-hs SDU of the addressed set of MAC-hs SDUs is a segment of a MAC-d PDU. The last MAC-hs SDU of the addressed set of MAC-hs SDUs is a segment of a MAC-d PDU. |

SUMMARY

Methods and apparatuses for versatile medium access control (MAC) multiplexing in evolved HSPA are disclosed. More particularly, methods for downlink optimization of the enhanced high speed MAC (MAC-ehs) entity and uplink optimization of the MAC-i/is entity are disclosed. Apparatuses for using the optimized downlink and uplink MAC entities are also disclosed.

BRIEF DESCRIPTION OF THE DRAWINGS

A more detailed understanding may be had from the following description, given by way of example and to be understood in conjunction with the accompanying drawings wherein:

FIG. 2 is a payload header used in multiplexing SDUs from different logical channels and priority queues;

FIG. 3b is a payload header format of a MAC-ehs PDU that contains k reordering PDUs used in multiplexing reordering PDUs from different logical channels and priority queues;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Embodiments resulting in an efficient MAC-ehs header (or MAC-i/is in the uplink) in the above-mentioned situations are disclosed. The embodiments improve the header structure to minimize the relative overhead while allowing multiplexing of logical channels of different types. The embodiments also eliminate the issue where a potentially ambiguous interpretation of the header could result when a unique segment of a SDU is present in the payload. The following definition is used throughout: "MAC-ehs payload unit" ("MAC-is payload unit") or "payload unit" are synonymous with a MAC-ehs SDU or a MAC-ehs SDU ("MAC-is SDU") segment that is inserted in the payload of a MAC-ehs PDU ("MAC-is SDU"). It is also synonymous with the term "reordering SDU". Although the embodiments describe downlink optimization of the MAC-ehs entity, the concepts are also applicable to the uplink (UL) by replacing the MAC-ehs with the MAC-i/is.

Figure 1:
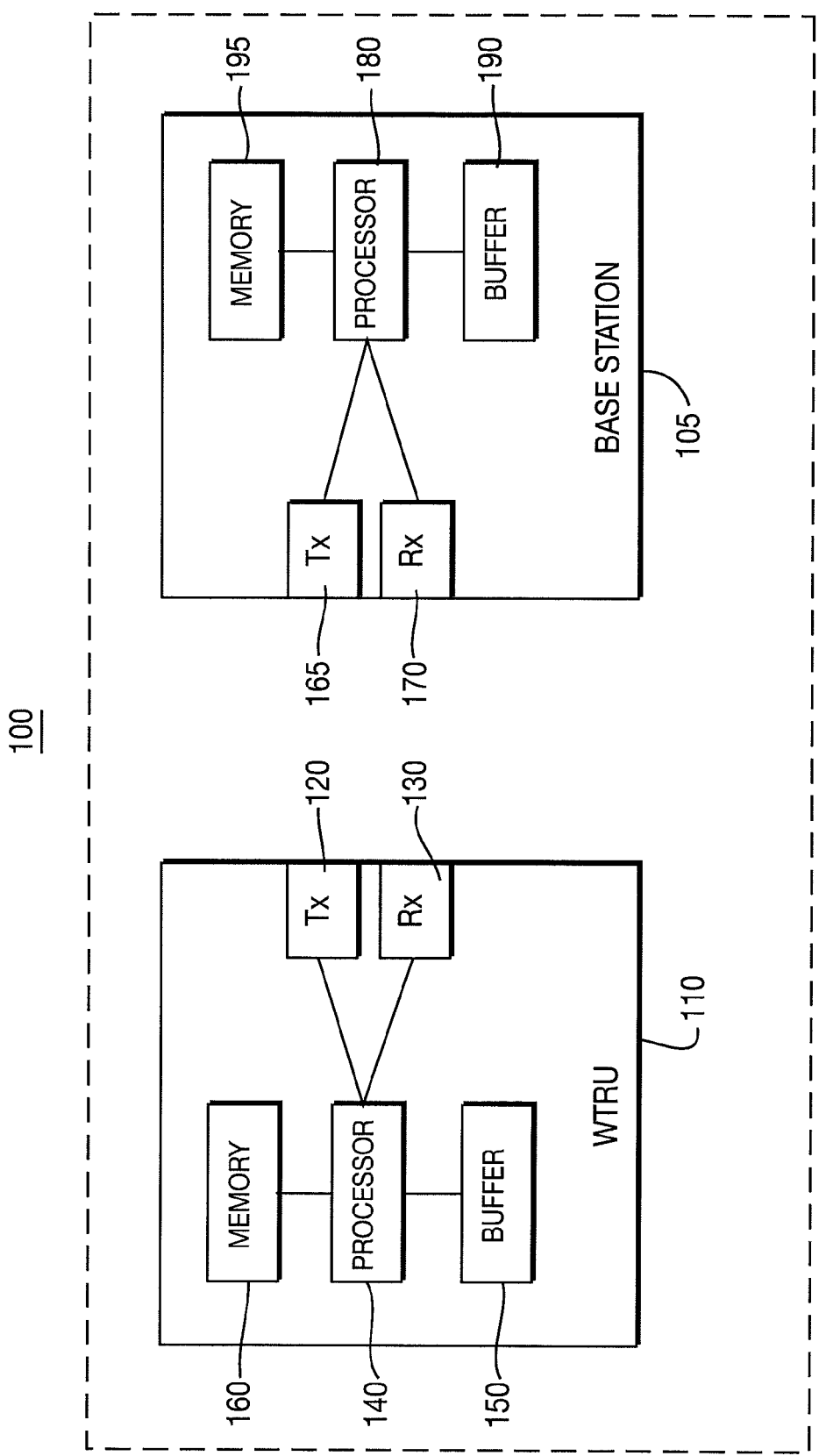
FIG. 1 is a block diagram of a wireless communication system configured for versatile MAC multiplexing in evolved HSPA.

FIG. 1 is a block diagram of a wireless communication system 100 configured for versatile MAC multiplexing in evolved HSPA. The system includes a base station 105 and a wireless transmit receive unit (WTRU) 110. The base station 105 and the WTRU 110 communicate via a wireless communications link.

As shown in FIG. 1, the WTRU 110 includes a transmitter 120, a receiver 130, and a processor 140. The processor 140 is attached to a buffer 150 and a memory 160. The processor 140 is configured to process payload units using at least one technique described below.

Also shown in FIG. 1, is the base station 105 which includes a transmitter 165, a receiver 170, and a processor 180. The processor 180 is attached to a buffer 190 and a memory 195. The processor 180 is configured to process payload units using at least one technique described below.

FIG. 2 is a payload header 200 used in multiplexing SDUs from different logical channels and priority queues. In a first embodiment, the multiplexing of SDUs from multiple priority queues into a single MAC-ehs PDU is disclosed. In addition, merging SDUs from multiple logical channels into a single priority queue is included.

A MAC-ehs PDU is built by concatenating and/or segmenting one or more SDUs from one or more priority queues.

A header is attached to the payload in a structure as set forth in FIG. 2. The header 280 includes a plurality of k queue sections 205, each k queue section 205 including a transmission sequence number (TSN) 240, an SDU description superfield (SDSF) 250, and a "finish" flag (F) 260. Each k queue section 205 corresponds to a priority queue from which SDU(s) (or segments thereof) are taken, where k is the number of priority queues from which SDUs are multiplexed in this MAC-ehs PDU. The header 280 can also include an optional version flag 210 and/or an optional queue ID field 230.

The optional version flag 210 indicates which version of the protocol is used to ensure backward compatibility. As a prior version of the MAC-ehs exists, this field should have two bits. The version flag 210 may be used when the radio bearer is mapped to support different MAC-ehs header formats. Each radio bearer is configured to use a particular format. Alternatively, the MAC-ehs format may be identified either explicitly or implicitly by signaling on the High Speed Shared Control Channel (HS-SCCH). Radio bearer multiplexing into a MAC-ehs PDU may be restricted by the MAC-ehs format configured for the radio bearer.

As shown in FIG. 2, each header 280 can include an optional queue ID field 230 which identifies to which reordering queue the corresponding SDUs in the payload belong. The reordering queues may or may not directly map to priority queues. The header 280 also includes at least one transmission sequence number (TSN) field 240 which identifies the sequence number of the data for this queue ID. Another feature included in the header 280 is at least one SDU description super-field (SDSF) 250 which indicates how to disassemble and/or reassemble SDUs and which logical channel(s) they belong to. Details and options for this superfield are described hereinafter. The header 280 could also include at least one optional "finish" flag 260 indicating whether this header section is the last section of the header or another sub-header follows.

The MAC-ehs header 280 is followed by the MAC-ehs payload 290 which includes a series of MAC-ehs SDUs or segments of MAC-ehs SDUs 295 and optional padding bits 270. The padding bits 270 can be added to the payload 290 as required, to maintain octet alignment at the MAC-ehs PDU level. Alignment with allowed Transport Block (TB) sizes is mapped to the HS-DSCH transport channel (TrCH).

Figure 3A:
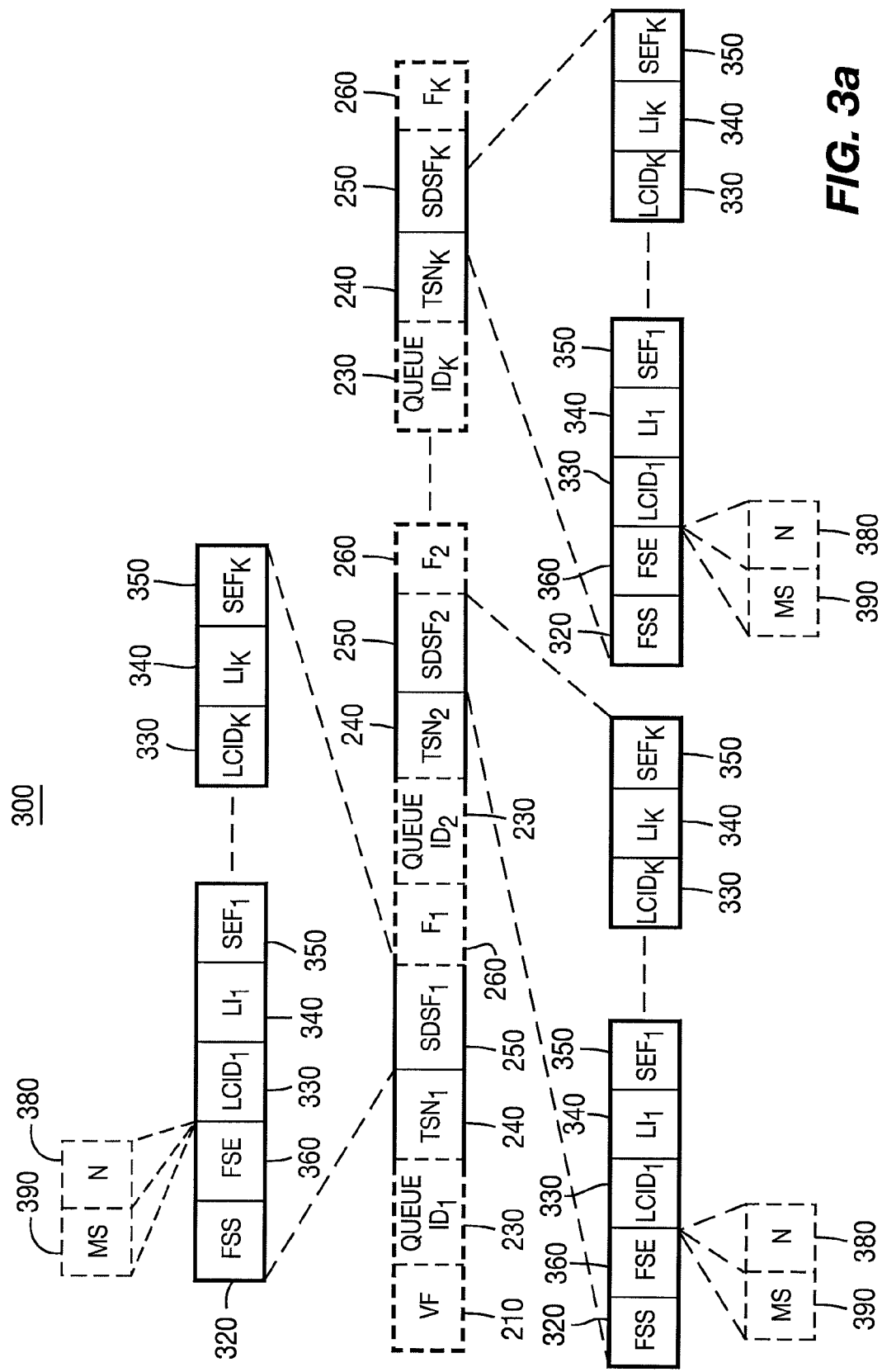
FIG. 3a is the general structure of an SDU description super-field (SDSF) field arranged to efficiently signal how SDUs are concatenated/segmented, their sizes, and the logical channels to which they correspond.

As shown in FIG. 3a, the SDU description super-field 250 is arranged as to efficiently signal how SDUs from one priority queue are concatenated/segmented, their sizes, and the logical channels to which they correspond.

Without loss of performance, SDUs can be segmented in a sequential manner within a priority queue. This means transmission of an SDU, or segment thereof, is restricted unless the last SDU or segment of the previous SDU has been transmitted (or is being transmitted in the same MAC-ehs PDU). With this constraint, at most two segments of (different) SDUs are present for a particular reordering queue in a MAC-ehs PDU, along with an unrestricted number of full (non-segmented SDUs) in between.

FIG. 3b is a payload header format of a MAC-ehs PDU that contains k reordering PDUs used in multiplexing reordering PDUs from different logical channels and priority queues. The position of the start of the payload 290 within the MAC-ehs PDU 395 for each reordering queue is assumed to be identifiable. For the data corresponding to the first reordering queue listed in the header 280, the start of the payload 290 immediately follows the header. This is also possible for the data corresponding to the subsequent reordering queues, provided that the SDSF field 250, shown in FIG. 3a, of each priority queue, with the exception of the last priority queue, is configured to determine the total size of the corresponding payload. The structure in FIG. 3a satisfies this requirement.

As shown in FIG. 3a, the general structure of the SDSF field 250, includes the following elements. A "full/segment start" (FSS) flag 320 indicates whether the data at the start position of the payload for this reordering queue corresponds to a segment of an SDU or a full SDU. A "full/segment end" (FSE) flag 360 follows the FSS flag indicating whether the data at the end position of the payload for this priority queue corresponds to a segment of a SDU or a full SDU. The combination of the FSS and the FSE is equivalent to a segmentation indication (SI) field 397 shown in FIG. 3b. For each SDU or SDU segment present in the payload 290, a logical channel indicator (LCID) field 330 is included which indicates the logical channel to which the SDU (or segment thereof) belongs, a length indicator (LI) field 340 indicating the length of the SDU (or segment thereof); (this field will be described in more detail in a subsequent embodiment); and an "SDU end" flag 350 indicating whether there is at least another SDU (or segment thereof) following this SDU or if this is the last SDU (or segment thereof) for this reordering queue; this field can have one bit.

It should be noted that both FSS 320 and FSE 360 flags should be set even if there is only one SDU (or segment thereof). It should also be noted that the FSS 320 and FSE 360 may be identified as a single field of two bits, which could be called, for instance, an SI. In this case, a one-to-one mapping may be defined between each possible combination of values of the flags FSS 320 and FSE and each possible combination of the two bits of the SI field. For instance:

FSS=Segment and FSE=Segment may be mapped to SI=1
FSS=Full and FSE=Segment may be mapped to SI=10
FSS=Segment and FSE=Full may be mapped to SI=01
FSS=Full and FSE=Full may be mapped to SI=00

Conversely, with the above mapping, the values of FSS and FSE may be retrieved as follows from the SI field:

FSS=Segment corresponds to the first payload unit being a segment.
  If there is only one payload unit and the segment is a middle segment it corresponds to SI=11 (i.e. FSE is also set to Full).
  If the segment is a last segment of a MAC-ehs SDU it corresponds to SI=01 when there is a single payload unit or if the last payload unit is a complete MAC-ehs SDU (i.e. FSE is set to Full) or to SI=11 when the last payload unit is a segment (i.e. FSE is set to segment).
FSS=Full corresponds to SI=10 when there is a single payload unit or when the last payload unit is a first segment of a MAC-ehs SDU (i.e. FSE is set to Full) or SI=00 when only complete MAC-ehs SDUs are present (i.e. FSE is also set to Full)
FSE=Segment corresponds to SI=11 or SI=10 depending on FSE as described above
FSE=Full corresponds to SI=01 or SI=00 depending on FSE as described above.

Also shown in FIG. 3a, the LCID 330 and LI 340 fields may together be identified as a single Data Description Indicator (DDI) field similar to the one used in enhanced dedicated channel (E-DCH) encoding for the uplink. However, the encoding principles may be different as will be described below.

Several options are possible for the encoding of the LCID field 330. One option is that the encoding may follow the same identification scheme for the target channel type field (TCTF) and control traffic numbering (C/T mux) in case of dedicated control channel/dedicated traffic channel (DCCH/DTCH). In the MAC-c layer, the TCTF fields and the C/T mux fields together identify a logical channel. The TCTF identifies the target channel type while the C/T mux identifies an index. In this option, the same type of encoding as in MAC-c could be possible. In this case, the mapping between TCTF and type of logical channel (e.g., common control channel (CCCH), paging control channel (PCCH), dedicated control channel (DCCH), etc.) may be specified in the same way as in known embodiments. In this case, the number of bits occupied by the LCID field are variable. Alternatively, the TCTF and C/T may be jointly coded into a common parameter. The channel type may be configured as C/T or unique values for the LCID may be specified.

Optionally, assuming that the maximum possible number of logical channels (of all types) that the receiver may be utilizing at a given time is NLmax, and NLmax can be represented by the number of bits for these logical channels (NLMb bits), the LCID field includes NLMb bits and contains a logical channel identifier. For example, the network can configure up to 16 logical channels (i.e. NLmax=16). Therefore, to be able to identify 16 logical channels, 4 bits (i.e. NLMb=4) would be required. The mapping between this logical channel identifier and the logical channel it corresponds to is known from prior radio resource control/Node B application part (RRC/NBAP) signaling and/or specified (pre-determined) in advance. Some values could be reserved to types of logical channels of which a single instance is possible. For instance, there can be only one CCCH and a specific value may be pre-determined for this channel.

Optionally, there could be a maximum possible number of logical channels that can be multiplexed in a given priority queue (NLQmax) which is smaller than the overall maximum possible number of logical channels that the receiver can utilize as a whole. If NLQmax can be represented by the number of bits that would be required to identify NLQmax (NLMQb bits), the LCID field includes NLMQb bits. In that case, the mapping between each possible set of values for the NLMQb bits and the logical channel type and/or index is specific to each priority queue and is known from prior RRC/NBAP signaling (which specifies a potentially different mapping for each defined priority queue). This option does not preclude the use of pre-determined values for certain types of logical channels as set forth above.

There are several options for configuring the MAC-ehs header as will be described in detail hereinafter. As shown in FIG. 3a, the SDSF field 250 may be defined to support the use of a "number" (N) field 380 to minimize the overhead when multiple SDUs belong to the same logical channel and/or have the same length follow each other.

The N field 380 could always be present and precede (or follow) the LCID 330 and LI 340 fields for every group of N consecutive SDUs that have the same length and belong to the same logical channel.

The N field 380 could always be present and precede (or follow) the LCID field 330 for every group of N consecutive SDUs that belong to the same logical channel; however, each SDU would have its own LI field 340.

The N field 380 could only be present for a group of N consecutive SDUs (with same length and logical channel) if N is larger than 1. A "multiple SDUs" (MS) flag 390 could indicate whether the N field 380 is present or not. This reduces the risk of excessive overhead due to the presence of the N field 380 when the SDUs of the payload are all of different length or belong to different logical channels.

The N field 380 could only be present for a group of N consecutive SDUs (from same logical channel) if N is larger than 1. A MS flag 390 could indicate whether the N field 380 is present or not. In any case, each SDU would have its own LI 340 field.

The N field 380 could be configured for specific LCIDs 330. The LCID 330 could unambiguously identify whether the N field 380 exists.

The LCID 330 may be omitted for the first SDU if this SDU is a segment. The rationale is that the information should have been present in a prior MAC-ehs PDU when the first segment was transmitted. Alternatively, the LCID field 330 may be omitted for the last SDU only if this SDU is a segment.

Instead of inserting a "SDU end" flag 350 for each SDU (or segment thereof) or group of SDUs, a single "NTot" field (not shown) for the whole SDSF field indicating the total number of SDU or SDU segments in the payload for this priority queue can be added. The size of this field depends on the maximum possible number of SDUs per priority queue within a MAC-ehs PDU.

Several methods exist for indicating the length of each SDU or segment thereof. Several embodiments exist for utilizing a LI 340 for every SDU or group or segment thereof. This embodiment explains how to structure the LI field 340 to efficiently signal the length of each SDU or group or segment thereof.

A LI 340 specifies the exact number of bits (or octets if it is imposed that each SDU be octet-aligned) that the SDU or segment thereof contains. This representation may be made using one of the commonly known binary formats (e.g., with the most significant bit (MSB) first or the least significant bit (LSB) first). The length of the LI 340 field depends on the maximum possible length of a SDU. Several possible options are possible for the length of the LI 340 field. In one option, the length of the LI 340 is pre-determined and fixed regardless of the logical channel (LCID field 330) and is the number of bits required to represent the maximum SDU size (in bits or octets) across all logical channels, regardless of any prior signaling to set the maximum SDU size for a given RLC instance. In an alternative option, the length of the LI 340 depends on the logical channel (LCID) field 330 and is the number of bits required to represent the maximum SDU size (in bits or octets) for this logical channel. The maximum SDU size may vary from one radio bearer instantiation to another and may change upon reconfiguration or even dynamically. To avoid possible ambiguity, the network may signal the receiver the size of the LI 340 field, while at the same time it may also signal a change of maximum SDU size.

Another variation includes mixed utilization of size indicators (SID) (not shown) and LIs 340. A size indicator (SID) is used by the transmitter whenever the length of the MAC-ehs SDU is one of a pre-defined set of sizes. A size indicator is a field with a small number of bits (e.g. 3) where each possible value represents a pre-defined SDU size. Otherwise, if the SDU size is not one of the set of pre-defined sizes, an LI 340 specifying the exact number of bits or octets (in binary format) is used for the case of non-octet-aligned SDUs. To allow the receiver to distinguish between an SID and an LI 340, a flag of one bit is inserted before either the SID or LI 340 field. Alternatively, application of the SID is dependent on the configuration of the LCID. In this case, use of SID or LI 340 is known based on the LCID value. It should be noted that the number of bits of the SID field does not need to be constant.

Minimization of the average number of bits needed to represent the size(s) of the SDUs contained in a MAC-ehs PDU can be achieved if the pre-defined set of sizes represented by the SIDs corresponds to the set of sizes that are encountered the most often. The mapping between a SID value and the corresponding SDU size should be known by at least the transmitter and the receiver. Several methods can be defined to determine a suitable mapping between SID values and SDU sizes and to signal this mapping to the receiver and/or transmitter.

One SID mapping method utilizes explicit radio network controller (RNC)-based mapping. In this method, the RNC determines the SID mapping and signals the mapping to both the base station and the WTRU through Iub and RRC signaling respectively. Using this method may be dependent on which LCID is present in the MAC-ehs PDU. It may also be dependent on whether the RNC is required to define a SID for every possible SDU size, wherein the base station can utilize the LI if the size of the SDU that has to be inserted is not one of the sizes mapped to the SID values. The RNC may select SDU sizes that are occurring more frequently (or expected to occur more frequently), such as (but not limited to) the maximum RLC PDU size, the size of a status RLC PDU, or the RLC PDU size that is observed to occur most often as seen by the RNC.

A second SID mapping method uses implicit mapping. In this method, the mapping between the SID and the SDU sizes is not signaled explicitly. Instead, a SID is implicitly assigned a certain SDU size by a rule known by the transmitter and the receiver. Examples of rules for SID mapping using this method include assigning a SID value #n1 to the maximum RLC PDU size, assigning a SID value #n2 to N, where N is a fixed value known to occur frequently, regardless of the scenario (e.g., the typical value of a status RLC PDU), or assigning a SID value #n3 to half (or a portion, such as a third or a fourth) of the maximum RLC PDU size, thus supporting segmentation in 2, 3 or 4 equal sizes.

A third SID mapping method uses base station-based mapping. In this method, the mapping between an SID value and an SDU size is determined based on observations of which SDU sizes tend to occur most often. This mapping is communicated through MAC signaling. One possible way of signaling the mapping is by using a "mapping" flag defined to follow the LI. When the flag is set, the following bits represent the SID value that the size represented by the LI will be mapped to in subsequent MAC-ehs PDUs following successful reception of this MAC-ehs PDU at the WTRU. Thus, the receiver waits for the next time it receives an SDU of the size that it desires to assign to a certain SID value. When the SDU is received and the MAC-ehs PDU is built, the LI is utilized to signal the length of the SDU as usual. The receiver sets the "mapping" flag and inserts the SID value to be set after it. Upon correct reception of the MAC-ehs PDU, the transmitter determines that the mapping flag is set and assigns the new size to the SID value following it, discarding any previously mapped size to this SID value.

Some specific embodiments that are possible for constraints on MAC-ehs multiplexing are disclosed. These constraints may be deemed necessary to satisfy the quality of service (QoS) requirements (e.g., retransmission, latency, block error ratio (BLER)) of the logical channels.

Multiplexing restrictions may be signaled on the Iub/Iur interface in the UMTS Terrestrial Radio Access Network (UTRAN) with control information specifying which priority queues can be multiplexed. If priority queues are formed from multiplexing logical channels, it can be determined which logical channels can be multiplexed if MAC-ehs multiplexing is directly from the logical channels (i.e., no priority queues are formed from logical channels or when there is a one-to-one mapping between priority queues and logical channels).

One application of the above MAC-ehs multiplexing restriction could be that signaling radio bearers (SRBs) are not multiplexed with non-signaling radio bearers. If SRBs are multiplexed separately from non-SRBs, the TB size determination for SRBs may be treated in the following manner. The RACH measurements can be used to determine the TB sizes for MAC-ehs PDUs carrying SDUs from SRBs and signaled to the MAC during configuration and reconfiguration signaling from radio resource control (RRC).

Figure 4:
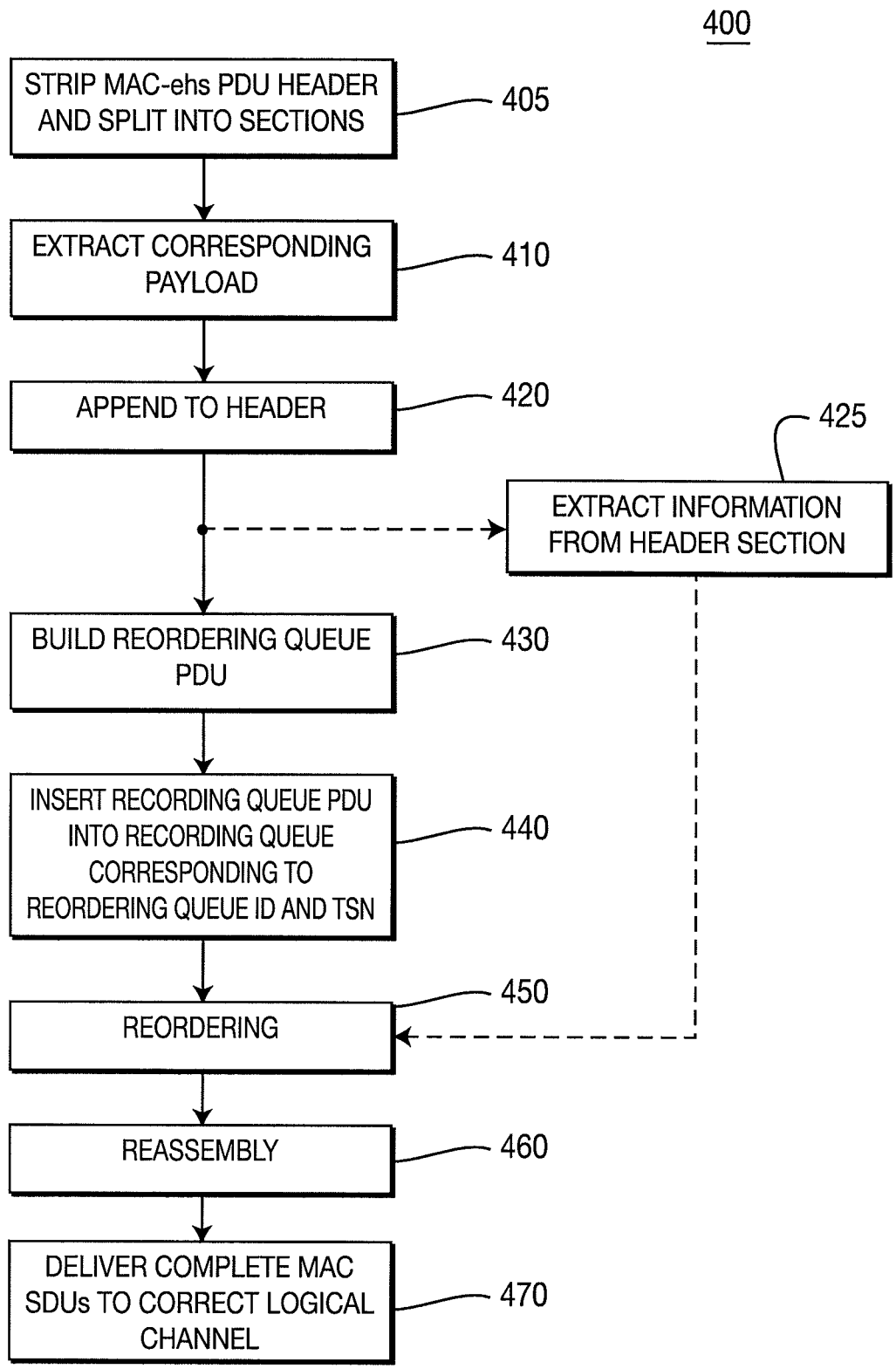
FIG. 4 is a flow diagram of the operations to process the MAC-ehs PDUs and reconstruct the MAC-ehs SDUs.

FIG. 4 is a flow diagram of the operations 400 performed to process the MAC-ehs PDUs and reconstruct the MAC-ehs SDUs. Upon reception of the MAC-ehs PDU, the MAC-ehs PDU header is stripped from the payload and split it into its sections at 405, utilizing the "finish" flag to find where the header finishes. For each header section (priority queue), the corresponding payload (SDUs and fragments thereof) is extracted as indicated from the SDSF at 410, attaches it to the header section itself at 420 to build a reordering "Queue PDU," 430 and inserts this Queue PDU into the reordering queue corresponding to the reordering queue ID and the TSN at 440. Alternatively, a PDU does not need to be built, but rather the information contained in the header section (e.g., TSN, SDSF) is extracted and associated with the corresponding payload within the reordering queue at 425 so that reordering can be performed in 450 and then disassembly and/or reassembly can be performed. Following the reordering process at 450, a reassembly is performed at 460. After reassembly at 460 is complete, the complete MAC SDUs are delivered to the correct logical channel at 470.

Within each reordering queue, the reordering functionality 450 is performed such that the MAC-ehs PDUs are replaced by one or more reordering Queue PDUs (or the set of TSN, SDSF and associated payload) and the reordered PDUs are sent to a MAC SDU disassembly/reassembly/demultiplexing unit (not shown) rather than just a disassembly unit (not shown). Also, a queue-specific timer (T1) (not shown) may be signaled. Each reordering queue may optionally have a separate T1 timer.

Figure 5:
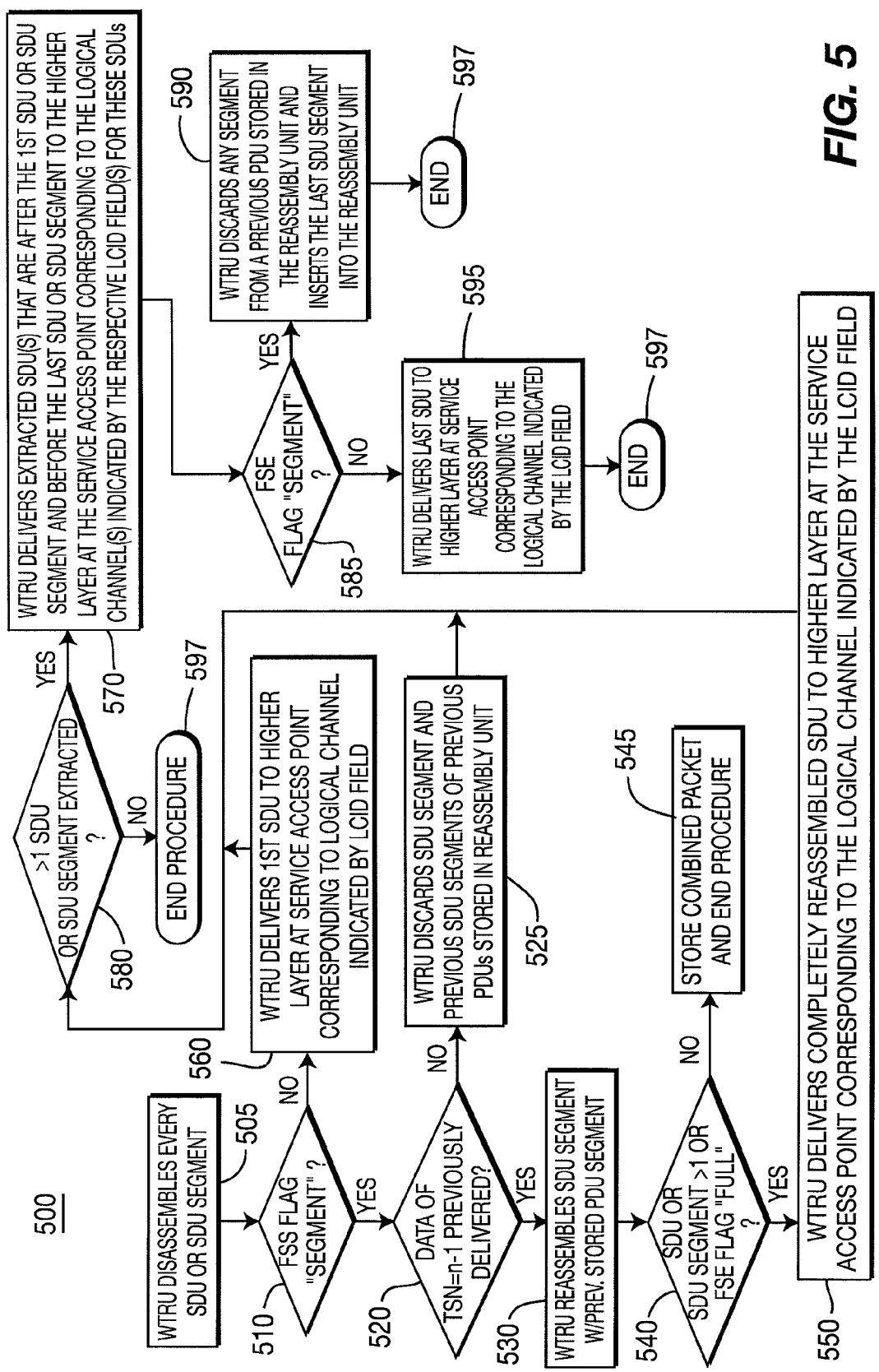
FIG. 5 is a flow diagram of data processing functionality within each disassembly/reassembly/demultiplexing unit.

FIG. 5 is a flow diagram of an example data processing functionality 500 within each disassembly/reassembly/demultiplexing unit. Reading the SDSF field, the data is processed within each disassembly/reassembly/demultiplexing unit. The following describes the operation for the data of TSN=n for this priority queue. As shown in FIG. 5, every SDU or SDU segment is disassembled at 505, utilizing the LI fields, the "SDU end" flag, and if applicable, the N fields. If the FSS flag is set to segment at 510 and if the data of TSN=n−1 for this priority queue has been previously delivered to this disassembly/reassembly/demultiplexing unit at 520, the SDU segment (first SDU of the payload for this priority queue) is reassembled with segments of previous PDUs stored in the reassembly unit at 530. A determination is made at 540 whether the number of SDUs or SDU segments is larger than 1 or if the FSE flag is set to "Full." If the number of SDUs or SDU segments is larger than 1, or if the FSE flag is set to "Full," the first SDU of the reordering PDU was the last segment of the MAC SDU and the completely reassembled SDU is delivered to the higher layer at the service access point corresponding to the logical channel indicated by the LCID field at 550. If the number of SDU or SDU segments is less than 1 and if the FSE flag is set to "segment," the SDU is a middle segment of the reordering PDU and the reassembled segments are stored and the procedure ends for that reordering queue PDU at 545.

If the FSS flag is set to "segment" at 510 and the data of TSN=n−1 for this priority queue has not been previously delivered (e.g., if the T1 timer has expired) at 520, the SDU segment is discarded and previous SDU segments of previous PDUs stored in the reassembly unit at 525. A determination at 580 is then performed to determine whether greater than 1

SDU segment has been extracted. If greater than 1 SDU or SDU segment has been extracted, the receiver delivers the extracted SDUs that are between the first SDU or SDU segment and the last SDU or SDU segment to the higher layer at the service access point corresponding to the logical channels indicated by the respective LCID fields at 570. If the FSE flag is set to "segment," the segment is a first segment of a MAC-ehs SDU, the receiver discards any segment from a previous PDU stored in the reassembly unit and inserts the last SDU segment into the reassembly unit at 590. If the FSE flag is set to "full," the last payload unit is a complete MAC-ehs SDU and the receiver delivers the last SDU to the higher layer at the service access point corresponding to the logical channel indicated by the LCID field at 595.

If the FSS flag is set to segment at 510 and the data of TSN=n−1 for this priority queue has been previously delivered at 520, the SDU segment is reassembled with the previously stored PDU segment. If it is determined at 540 that the SDU or SDU segment is greater than 1 or that the FSE flag is set to "full," the receiver delivers the completely reassembled SDU to the higher layer at the service access point corresponding to the logical channel indicated by the LCID field at 550. A determination at 580 is then performed to determine whether greater than 1 SDU segment has been extracted. If greater than 1 SDU or SDU segment has been extracted, the receiver delivers the extracted SDUs that are between the first SDU or SDU segment and the last SDU or SDU segment to the higher layer at the service access point corresponding to the logical channels indicated by the respective LCID fields at 570. If the FSE flag is set to "segment," the segment is a first segment of a MAC-ehs SDU the receiver discards any segment from a previous PDU stored in the reassembly unit and inserts the segment into the reassembly unit at 590. If the FSE flag is set to "full," the receiver delivers the last SDU to the higher layer at the service access point corresponding to the logical channel indicated by the LCID field at 595. If it is determined at 540 that the SDU or SDU segment is less than 1 or that the FSE flag is set to "segment," the packet is combined and stored, and the procedure ends at 545.

When the FSS flag is set to "full" at 510 and FSE is not set to "segment" and the first payload unit is a complete SDU and the first SDU is delivered to the higher layer at the service access point corresponding to the logical channel indicated by the LCID field at 560. A determination at 580 is then performed to determine whether greater than 1 SDU segment has been extracted. If greater than 1 SDU or SDU segment has been extracted, the receiver delivers the extracted SDUs up to the last SDU or SDU segment to the higher layer at the service access point corresponding to the logical channels indicated by the respective LCID fields at 570. If the FSE flag is set to "segment," the receiver discards any segment from a previous PDU stored in the reassembly unit and inserts the last SDU segment into the reassembly unit at 590. If the FSE flag is set to "full," the receiver delivers the last SDU to the higher layer at the service access point corresponding to the logical channel indicated by the LCID field at 595.

In another embodiment, a modification to the baseline header can be introduced to more efficiently support logical channel(s) to which a pre-defined set of RLC sizes apply, i.e., that are not used by RLC instances configured with the flexible RLC PDU size available in 3GPP Release 7. For instance, these channels could be used by AM RLC instances configured with fixed PDU size, or unacknowledged mode (UM) RLC instances configured with fixed PDU sizes.

Figure 6:
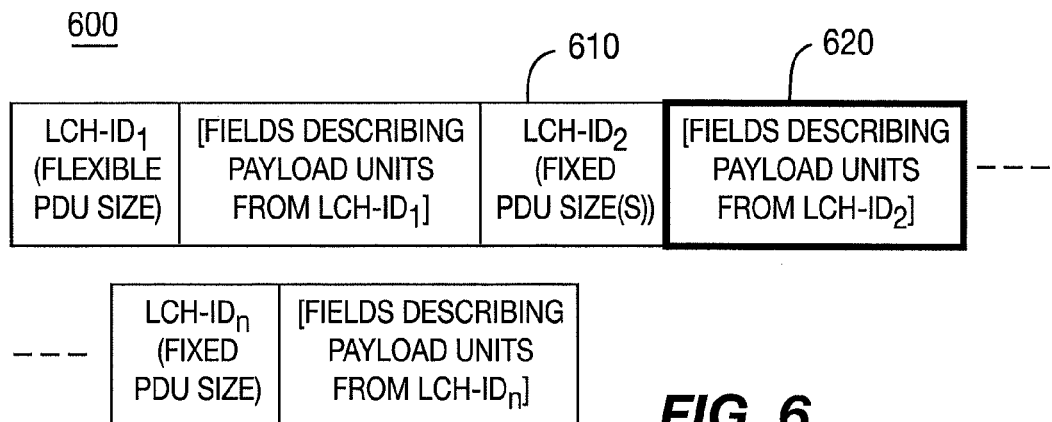
FIG. 6 is the parts of the header describing SDU(s) belonging to the concerned logical channels to allow efficient multiplexing of different types of logical channels in the same MAC-ehs PDU.

FIG. 6 is the parts of the header 600 describing SDU(s) belonging to the concerned logical channels to allow efficient multiplexing of different types of logical channels in the same MAC-ehs PDU. The modifications described in this embodiment can affect only the parts of the header 600 that describe SDU(s) belonging to the concerned logical channels. In other words, if there are other logical channels multiplexed in the same MAC-ehs PDU, to which flexible PDU size applies, the parts of the header corresponding to these logical channels may still follow the baseline header or any improvement of the baseline header applicable to these channels. This allows efficient multiplexing of different types of logical channels in the same MAC-ehs PDU. In this example, only the logical channel identified by LCH-ID2 610 is used by an RLC instance configured with fixed PDU size(s). The modifications described below apply only to its associated fields 620 (indicated in bold in FIG. 6). This part of the header 600 will be referred to hereafter as "header part."

There are multiple options for this embodiment. Option 1 does not allow segmentation for the concerned logical channel, but is simpler. Options 2a and 2b allow segmentation.

Figure 7:
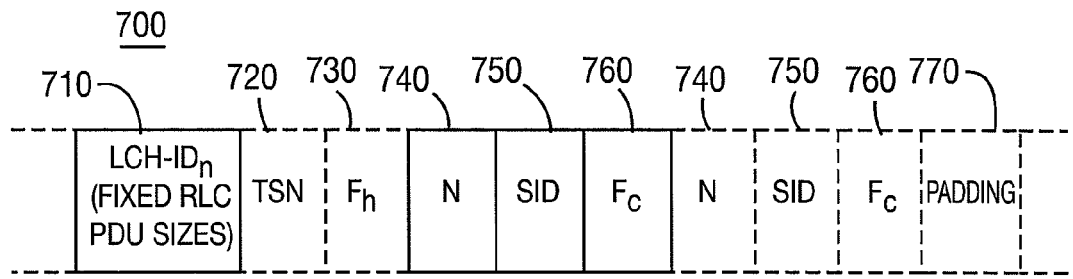
FIG. 7 is an alternate configuration for the header describing SDU(s) belonging to the concerned logical channels to allow efficient multiplexing of different types of logical channels in the same MAC-ehs PDU.

FIG. 7 is a configuration for the header 700 describing SDU(s) belonging to the concerned logical channels to allow efficient multiplexing of different types of logical channels in the same MAC-ehs PDU. Option 1 does not allow for segmentation for logical channels to which fixed PDU size(s) apply. The header part immediately following the logical channel ID 710 includes the following fields, not necessarily in order. Optionally, a transmission sequence number (TSN) 720 follows the logical channel ID 710. This field may not be required when the previous logical channel in the header is utilizing the same reordering queue. Optionally, a field flag (Fh) 730 may follow indicating whether this is the last set of MAC-ehs payload units of the header. This field may not be required where the end of the header is determined by comparing the size of the MAC-ehs PDU to the sum of sizes of payload units decoded so far. Alternatively, this field may also be used to indicate the end of a priority queue.

The header 700 usually includes a field (N) 740 indicating a number of concatenated SDUs of the same size from the logical channel. In one option, a field (SID) 750 indicating the size of the SDU(s) whose number is indicated in the previous field may be included. An optional "finish" (Fc) flag 760 indicating whether the part of the header corresponding to this logical channel is completed may be included. If this flag is present and indicates that the header is not complete, an additional set of (N, SID, Fc) fields follow for this logical channel to indicate another group of N SDUs with size indicated by the SID field. In another option, padding bits 770 as required for maintaining byte-alignment of the header may be included. These padding bits could instead be present at the very end of the header in case SDUs from multiple logical channels are multiplexed in the MAC-ehs PDU.

For logical channels to which a single fixed RLC PDU size applies, such as logical channels used by AM RLC instances, the Fc field (finish flag) 760 could be omitted, since it is known in advance that there will not be another group of SDUs with different sizes. Furthermore, if in addition the size itself is known, the SID field 750 could also be omitted.

Figure 8:
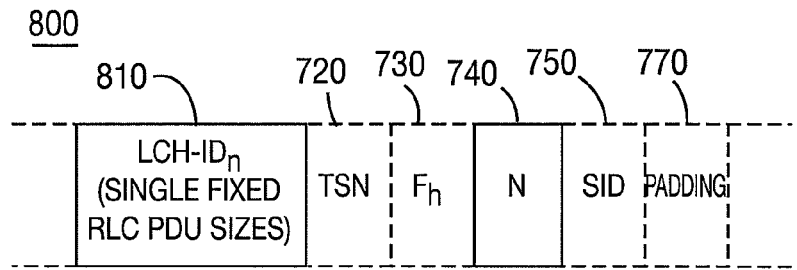
FIG. 8 is an alternate configuration for the header describing SDU(s) belonging to the concerned logical channels to allow efficient multiplexing of different types of logical channels in the same MAC-ehs PDU.
Figure 9:
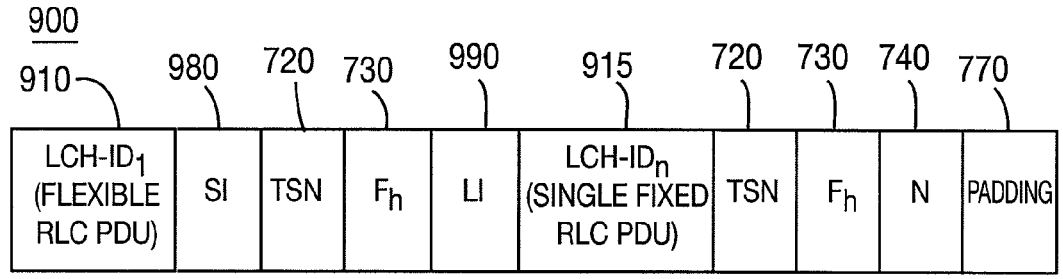
FIG. 9 is an alternate configuration for the header describing SDU(s) belonging to the concerned logical channels to allow efficient multiplexing of different types of logical channels in the same MAC-ehs PDU.

Examples of alternate configurations are illustrated in FIGS. 8 and 9. The components shown in FIGS. 8 and 9 correspond to the components in FIG. 7. FIG. 8 is a header 800 example where the LCH-ID includes single fixed RLC PDU sizes. FIG. 9 is a header 900 example where MAC-ehs SDUs from two logical channels are multiplexed together. One logical channel is used by an RLC instance configured with flexible RLC PDU size, while the other logical channel is used by an RLC instance configured with a single fixed RLC PDU size. In this example, the two logical channels 910 and 915 are not in the same priority queue, hence the TSN field 920 is present for both.

Option 2a allows segmentation for logical channels to which fixed PDU sizes apply. With this option, the header part immediately following the logical channel ID includes a 1-bit flag field (Ff) (not shown) indicating whether the following fields are "N" and "SID" as described in Option 1. If this flag indicates that "N" and "SID" are present, the rest of the header part is interpreted as in Option 1.

If the Ff flag does not indicate that "N" and "SID" are present, a segmentation indication (SI) field 980 indicating the segmentation status of the payload may be included. For instance, this field could indicate if the first payload unit is a segment and if the last payload unit is a segment. When a single payload unit is allowed, the field indicates whether the payload unit is a complete SDU or the starting segment, middle segment, or final segment of the SDU. The SI field 980 may not be present if it is already indicated in a previous header part for a logical channel that is multiplexed on the same priority queue as this logical channel. In one option, a TSN 920 may be included. This field may not be required in case the previous logical channel in the header is utilizing the same reordering queue.

Optionally, a field flag (Fh) indicating whether this is the last set of MAC-ehs payload units of the header may be included. This field may not be required in case the end of the header is determined by comparing the size of the MAC-ehs PDU to the sum of sizes of payload units decoded so far. Alternatively, this field may also be used to indicate the end of a priority queue.

In another option, a length indicator (LI) 990 indicating the length of the payload unit for this logical channel may be included. As will be described in another embodiment, this field may not be required if this payload unit is a segment and is at the end of the MAC-ehs PDU. The LI 990 may also be used to indicate a group of payload units (e.g., complete SDUs possibly followed by a segment of SDUs) in case a single fixed PDU size applies to the logical channel (e.g., if it is used by an AM RLC entity with fixed RLC PDU size) and provided that the transmitter knows about this size. This is accomplished by having the LI 990 indicate the total number of bytes from the group of payload units. The individual payload units are determined by performing an integer division of the LI 990 value by the known fixed RLC PDU size. The result is the number of complete SDUs, and the remainder of the division is the size of the SDU segment at the end. In another configuration, padding bits 970 as required for maintaining byte-alignment of the header may be included. These padding bits 970 could instead be present at the very end of the header in case SDUs from multiple logical channels are multiplexed in the MAC-ehs PDU.

Option 2b allows for segmentation for logical channels to which fixed PDU size(s) apply. This option may be used when the SI field 980 is indicated once per priority queue. With this option, the header part immediately following the logical channel ID 910 may include a 1-bit flag field (Ff) (not shown) indicating whether the payload unit(s) is/are the last of the priority queue onto which the logical channel is multiplexed. This flag may not be required if it is known otherwise that the payload unit(s) is/are the last of the priority queue (e.g., using other fields in previous header parts).

If this is not the last payload unit(s) of the priority queue, or if the SI field 980 applicable to this priority queue indicates that the last payload unit of this priority queue is not a segment, then the rest of the header part is interpreted as in Option 1.

If this is the last payload unit(s) of the priority queue, or if the SI field 980 applicable to this priority queue indicates that the last payload unit of this priority queue is a segment, a LI 990 indicating the length of the payload unit for this logical channel may be included. As will be described in another embodiment, this field may not be required if this payload unit is a segment and is at the end of the MAC-ehs PDU. The LI 990 may also be used to indicate a group of complete SDUs possibly followed by a segment of SDUs in case a single fixed PDU size applies to the logical channel, as described in Option 2a. In another configuration, padding bits 970 as required for maintaining byte-alignment of the header may be included. These padding bits 970 could instead be present at the very end of the header in case SDUs from multiple logical channels are multiplexed in the MAC-ehs PDU.

With the introduction of optimized MAC-ehs headers, a new definition for SI has been proposed. However, the proposed scheme does not properly handle the distinction between multiple and single payload units within the reordering PDU. When a single payload unit is present in the reordering PDU, it is ambiguous which SI indication should be used. In the proposed SI structure, "10" corresponds to the first payload unit being a complete unit, and if more than one payload unit is present in the reordering PDU, the last payload is a segment. With this definition, if only one payload unit is present, then it will be a complete MAC-ehs PDU, however it should be a segment that corresponds to the first segment of a MAC-ehs PDU. Moreover, when SI is equivalent to "11," the definition corresponds only to multiple payload units. When setting the SI fields, the transmitter must know exactly what to indicate, when a single payload unit is present in the reordering PDU. Since a single payload unit can correspond to a first, middle, last, or complete MAC-ehs SDU, the transmitter shall specify the correct SI indication so that the segments can be correctly reassembled. More specifically, the following changes and/or interpretation of the SI field may be considered to specifically cover the scenario where the reordering PDU contains only one payload unit.

Figure 10:
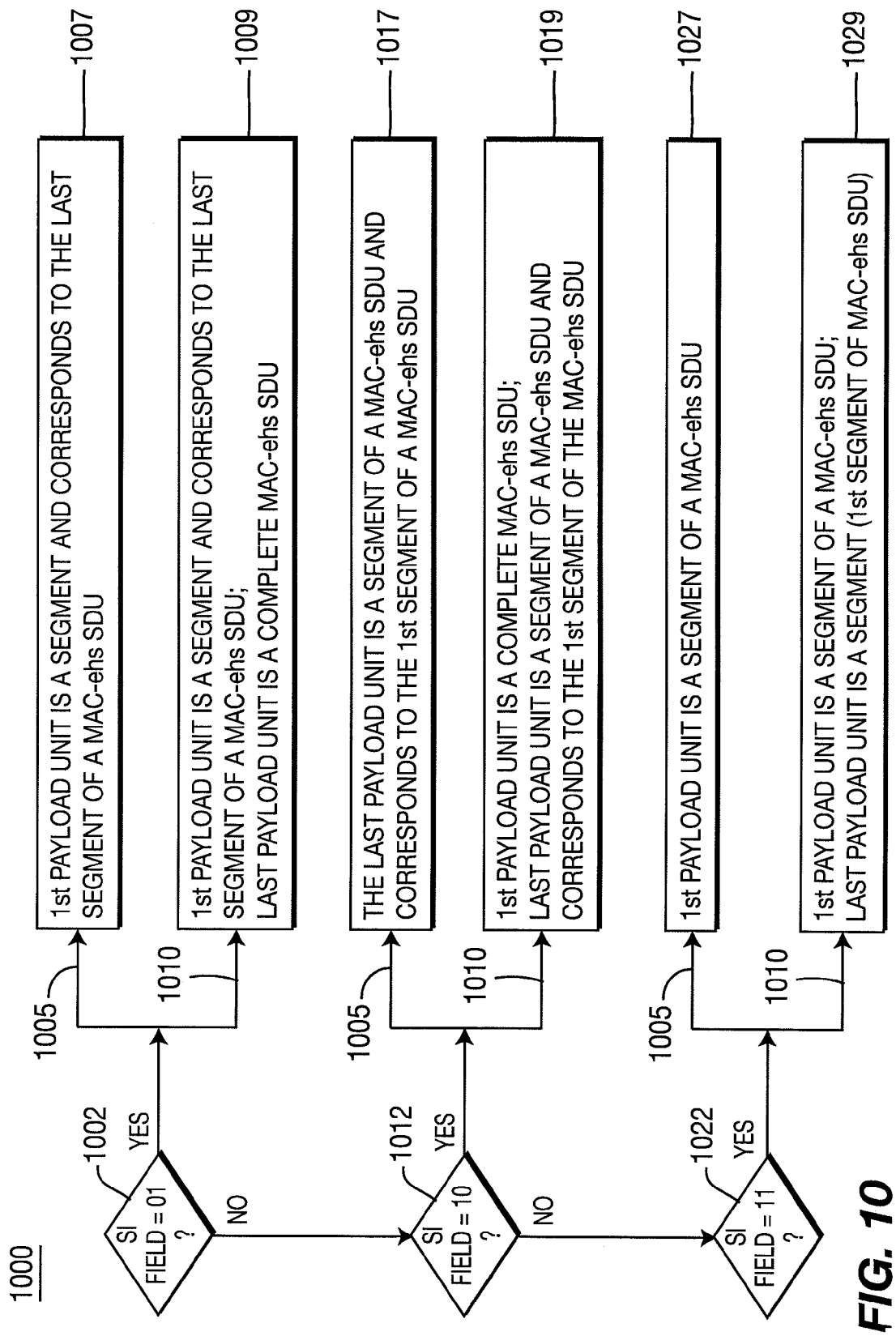
FIG. 10 is a flow diagram of a modified method for interpretation of the SI field where the reordering PDU contains only one reordering SDU.

FIG. 10 and Table 2 show a modified method 1000 for interpretation of the SI field where the reordering PDU contains only one payload unit. All of the SDUs of the reordering PDU are complete MAC PDUs when the SI is equal to "00" (not shown). As shown in FIG. 10, when SI is equal to "01" at 1002, the first payload unit of the reordering PDU is a segment and it corresponds to the last segment of a MAC-ehs SDU (MAC-ehs SDU is used interchangeably with MAC-d PDU) at 1007. This is applicable to a single payload unit 1005 or multiple payload units 1010 in the PDU. If there is more than one payload unit, the last payload unit is a complete MAC-ehs SDU at 1009.

When SI is equal to "10" at 1012, if there is more than one payload unit in the reordering PDU, then the first payload unit is a complete MAC-ehs SDU at 1019. The last payload unit of the reordering PDU is a segment of a MAC-ehs SDU and it corresponds to the first segment of the MAC-ehs SDU at 1019. This corresponds to the case where there is a single payload unit or multiple payload units in the reordering PDU at 1017 and 1019.

When SI is equal to "11" at 1022, the first payload unit is a segment of a MAC-ehs SDU at 1027. Note that this segment can be a last segment of a MAC-ehs SDU (when there are multiple payload units) or it can be a middle segment if there is only one payload unit in the reordering PDU. For example, if there are multiple payload units at 1027, the segment is a last segment of the MAC-ehs SDU. If there is a single payload unit at 1027, the segment is a middle segment of a MAC-es SDU. If there are multiple payload units, then the last payload unit is a segment at 1029. This segment will be the first segment of MAC-ehs SDU at 1029.

Table 2 shows the encoding of the SI field as described above, where the terminology MAC PDU corresponds to a MAC-c/d PDU or a MAC-ehs SDU. A SDU is the equivalent of a reordering SDU or a MAC-ehs SDU or segment thereof.

TABLE 2

| SI Field | Segmentation indication |
| --- | --- |
| 00 | The first SDU of the reordering PDU is a complete MAC PDU. The last SDU of the reordering PDU is a complete MAC PDU. |
| 01 | The first SDU of the reordering PDU is a last segment of a MAC PDU. If there is more than one SDU in the reordering PDU, the last SDU of the reordering PDU is a complete MAC PDU. |
| 10 | If there is more than one SDU in the reordering PDU, the first SDU of the reordering PDU is a complete MAC PDU. The last SDU of the reordering PDU is a first segment of a MAC PDU. |
| 11 | If there is more than one SDU in the reordering PDU, the first SDU is the last segment of a MAC PDU and the last SDU of reordering PDU is a first segment of a MAC PDU. If there is a single SDU in the reordering PDU the segment is a middle segment of a MAC PDU |

The following embodiment provides improved signaling of segmentation. This embodiment describes a method of encoding the bits of the SI field 980 when the SI field 980 is present once per priority queue. There are two options, one applying to the 2-bit SI field and the other for the 1-bit SI field.

Figure 11:
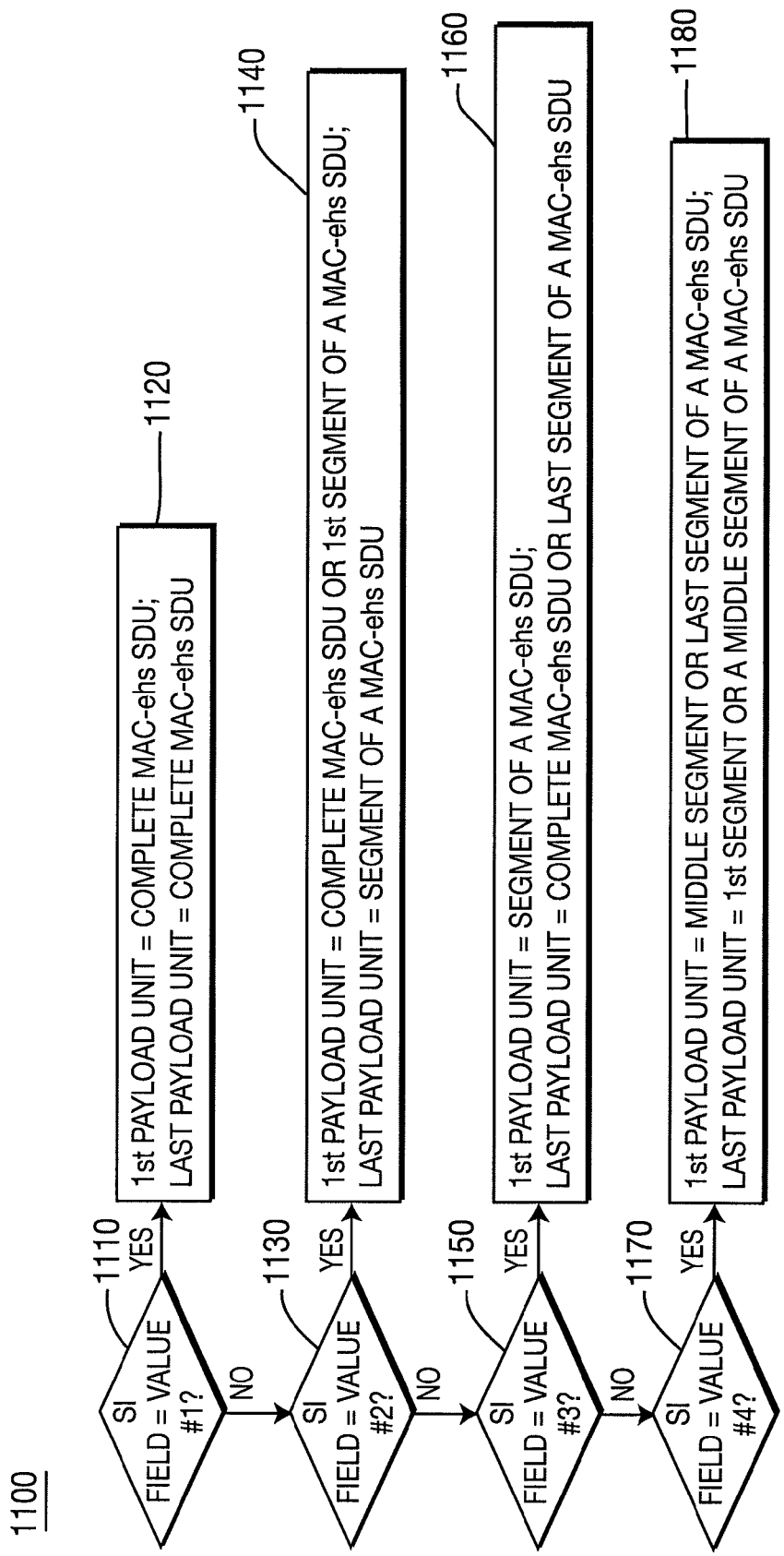
FIG. 11 is how a 2-bit SI field can be used as one possible encoding for minimizing overhead.

As shown in FIG. 11 and Table 3 below, a 2-bit SI field can be used as one possible encoding for minimizing overhead. It should be understood that the exact choice of bit combinations for each value is arbitrary and could be changed provided that two values are assigned the same bit combination. Table 3 shows an example of improved signaling of the segmentation indication field.

TABLE 3

| SI Field | Segmentation indication |
| --- | --- |
| Value #1 (e.g., 00) (1110) | The first payload unit of the addressed set of payload units is a complete MAC-ehs (or MAC-is) SDU. The last payload unit of the addressed set of payload units is a complete MAC-e/hs (or MAC-is) SDU. (1120) |
| Value #2 (e.g., 10) (1130) | The first payload unit of the addressed set of payload units is a complete MAC-ehs (or MAC-is) SDU or the first segment of a MAC-ehs (or MAC-is) SDU. The last payload unit of the addressed set is a segment of a MAC-ehs (or MAC-is) SDU. (1140) |
| Value #3 (e.g., 01) (1150) | The first payload unit of the addressed set of payload units is a segment of a MAC-ehs (or MAC-is) SDU. The last payload unit of the addressed set of payload units is a complete MAC-ehs (or MAC-is) SDU or the last segment of a MAC-ehs (or MAC-is) SDU. (1160) |

TABLE 3-continued

| SI Field | Segmentation indication |
| --- | --- |
| Value #4 (e.g., 11) (1170) | The first payload unit of the addressed set of payload units is a middle segment or a last segment of a MAC-ehs (or MAC-is) SDU. The last payload unit of the addressed set of payload units is the first segment or a middle segment of a MAC-ehs (or MAC-is) SDU. (1180) |

The advantage of the encoding depicted in Table 3 is that in case the addressed set of MAC-ehs payload unit(s) are of a single SDU segment, the determination can be based on the SI field and whether this SDU segment completes the SDU or not. Otherwise, the determination is based on the presence of padding bits, and there can even be ambiguity if the last segment exactly fits into the remaining available payload.

In addition, the encoding shown in Table 3 is more robust to missing MAC-ehs PDUs. For example, where a MAC-ehs PDU of TSN #n for a given priority queue is missing, and the first payload unit for the MAC-ehs PDU of TSN #n+1 is a segment, the original encoding did not allow determining whether the first payload unit is a first or middle segment. In the latter case, the payload unit would have to be discarded since the first part of the SDU is missing. The new encoding fixes this issue by differentiating between the two cases.

Figure 12:
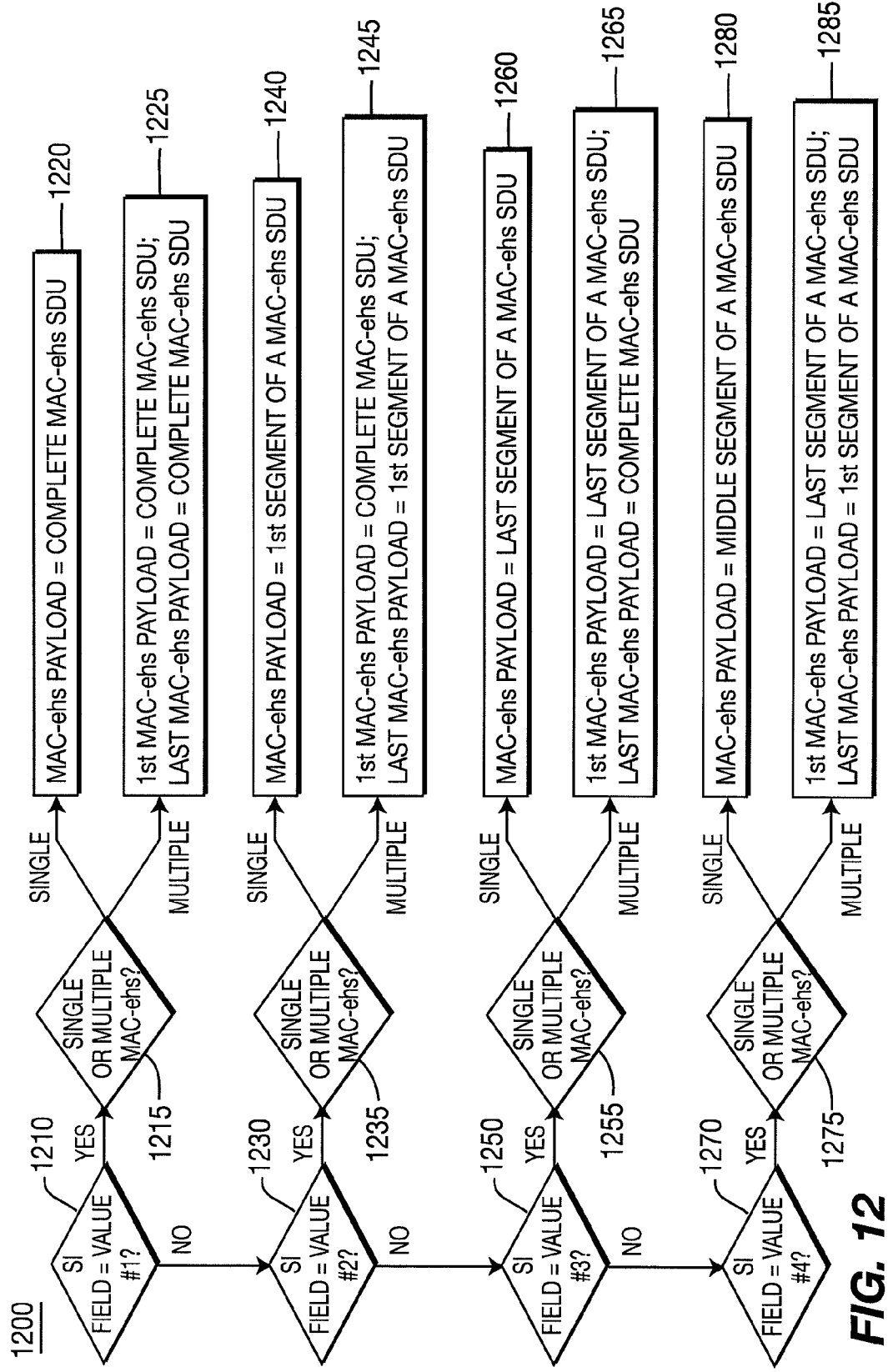
FIG. 12 is an alternative method of formulating the encoding where the SI field may be predetermined.

FIG. 12 is a flow diagram of an alternative method 1200 of formulating the encoding where the SI field may be defined as shown in Table 4. Table 4 shows an alternative formulation for improved signaling of the segmentation indication field. This formulation is completely equivalent to the one shown in Table 3, but may be easier to understand. This is achieved by separating the cases according to whether there is a single payload unit or multiple payload units in the addressed set.

TABLE 4

| | Segmentation indication (1215, 1235, 1255, 1275) | |
| --- | --- | --- |
| SI Field | Single MAC-ehs (or MAC-is) payload unit in addressed set | Multiple (>1) MAC-ehs (or MAC-is) payload units in addressed set |
| Value #1 (e.g. 00) (1210) | The MAC-ehs (or MAC-is) payload unit is a complete MAC-ehs (or MAC-is) SDU (1220) | The first MAC-ehs (or MAC-is) payload unit of the addressed set is a complete MAC-ehs (or MAC-is) SDU. The last MAC-ehs (or MAC-is) payload unit of the addressed set is a complete MAC-ehs (or MAC-is) SDU. (1225) |
| Value #2 (e.g. 10) (1230) | The MAC-ehs (or MAC-is) payload unit is the first segment of a MAC-ehs (or MAC-is) SDU (1240) | The first MAC-ehs (or MAC-is) payload unit of the addressed set is a complete MAC-ehs (or MAC-is) SDU. The last MAC-ehs (or MAC-is) payload unit of the addressed set is the first segment of a MAC-ehs (or MAC-is) SDU. (1245) |
| Value #3 (e.g. 01) (1250) | The MAC-ehs (or MAC-is) payload unit is the last segment of the MAC-ehs (or MAC-is) SDU (1260) | The first MAC-ehs (or MAC-is) payload unit of the addressed set is the last segment of a MAC-ehs (or MAC-is) SDU. The last MAC-ehs (or MAC-is) payload unit of the addressed set is a complete MAC-ehs (or MAC-is) SDU. (1265) |

TABLE 4-continued

| SI Field | Segmentation indication (1215, 1235, 1255, 1275) | |
|---|---|---|
| | Single MAC-ehs (or MAC-is) payload unit in addressed set | Multiple (>1) MAC-ehs (or MAC-is) payload units in addressed set |
| Value #4 (e.g. 11) (1270) | The MAC-ehs (or MAC-is) payload unit is a middle segment of the MAC-ehs (or MAC-is) SDU (1280) | The first MAC-ehs (or MAC-is) payload unit of the addressed set is the last segment of a MAC-ehs (or MAC-is) SDU. The last MAC-ehs (or MAC-is) payload unit of the addressed set is the first segment of a MAC-ehs (or MAC-is) SDU. (1285) |

With the proposed type of encoding, the reassembly function would be modified as follows, such that the choice of the SI field values would correspond to the examples shown in Table 4. The "reordering PDU" referred to in the following procedure refers to a set of MAC-ehs payload units that belong to the same priority queue. Also note that the term "output entity" may refer to a de-multiplexing entity, or layer/sub-layer above the MAC-ehs, or any other entity that the reassembly unit delivers SDUs to.

The SI field can be used to determine if a segment is a start or middle segment. Several cases can be distinguished depending on the number of bits of the SI field and whether it is present once for each priority queue or present for every SDU or segment thereof.

A first example is a 2-bit SI, one SI per priority queue, where the encoding is per the embodiments described in either of Tables 3 or 4. In this example, the bit combination indicates if the last SDU or SDU segment of the addressed set of the priority queue is a start or middle segment of an SDU.

A second example is a 2-bit SI, one SI for each SDU or SDU segment encoding as shown in either of Tables 3 or 4. In this example, the bit combination indicates if the SDU or SDU segment is a start or middle segment of a SDU.

Figure 13:
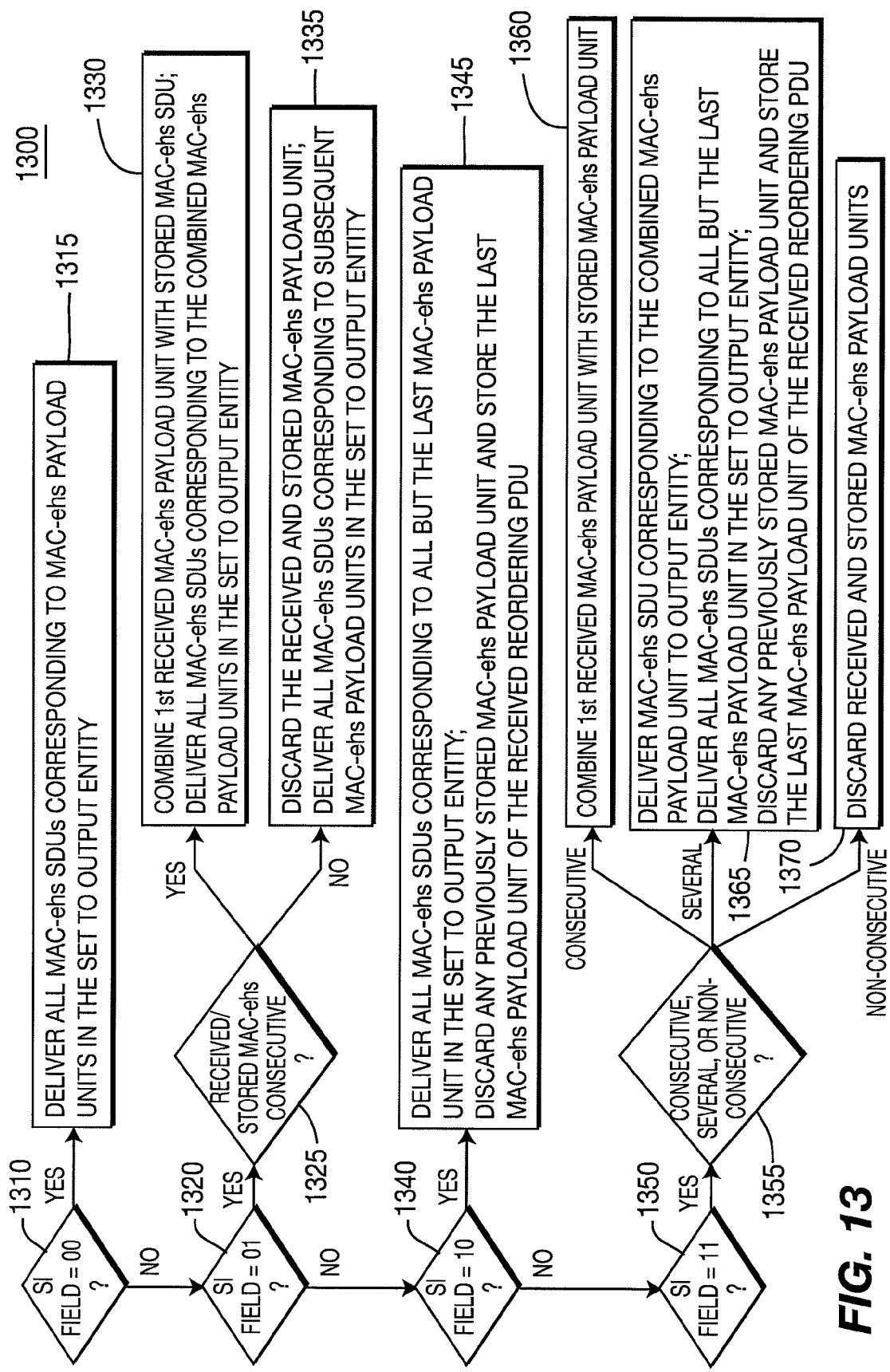
FIG. 13 is a flow diagram of how the reassembly unit processes the SI field associated with a reordering PDU.

FIG. 13 is a flow diagram of the reassembly unit processes 1300 for the SI field associated with a reordering PDU. If the SI field is set to "00" to indicate that the first and last MAC-ehs payload units of the set are complete MAC-ehs SDUs at 1310, all MAC-ehs SDUs corresponding to MAC-ehs payload units in the set are delivered to the output entity at 1315.

If, at 1320, the SI field is set to "01" to indicate that the first MAC-ehs payload unit is a segment of a MAC-ehs SDU, but the last MAC-ehs payload unit is a complete MAC-ehs SDU or is the last segment of a MAC-ehs SDU, a determination of whether the received and stored MAC-ehs payload units are consecutive can be made at 1325. If the received and stored MAC-ehs payload units are consecutive, the first received MAC-ehs payload unit is combined with the stored MAC-ehs SDU and the MAC-ehs SDU corresponding to the combined MAC-ehs payload unit is delivered to the output entity at 1330. If the received and stored MAC-ehs payload units are not consecutive, the received and stored MAC-ehs payload unit are discarded and all the MAC-ehs SDUs corresponding to subsequent MAC-ehs payload units in the set are delivered to the output entity at 1335.

If, at 1340, the SI field is set to "10" to indicate that the last MAC-ehs payload unit is a segment of a MAC-ehs SDU, but the first is a complete MAC-ehs SDU or the first segment of a MAC-ehs SDU, all the MAC-ehs SDUs corresponding to all but the last MAC-ehs payload unit in the set are delivered to output entity and any previously stored MAC-ehs payload unit are discarded while the last MAC-ehs payload unit of the received reordering PDU is stored at 1345.

If, at 1350, the SI field is set to "11" to indicate that the first MAC-ehs payload unit is a middle segment of a last segment of a MAC-ehs SDU and the last MAC-ehs payload unit is the first segment or a middle segment of a MAC-ehs SDU, a determine of whether the received and stored MAC-ehs payload units are consecutive can be made at 1355. If the received and stored MAC-ehs payload units are consecutive, the first received MAC-ehs payload unit is combined with the stored MAC-ehs payload unit at 1360. If there are several MAC-ehs payload units in the set, the MAC-ehs SDU corresponding to the combined MAC-ehs payload unit is delivered to output entity, all the MAC-ehs SDUs corresponding to all but the last MAC-ehs payload unit in the set are delivered to output entity, and any previously stored MAC-ehs payload unit is discarded while the last MAC-ehs payload unit of the received reordering PDU is stored at 1365. If the received and stored MAC-ehs payload units are not consecutive, the received and stored MAC-ehs payload units are discarded at 1370.

In order to reflect these definitions, one possible alternate of updating the table with the structure of the SI field is shown in Table 4. Table 4 is a formulation of the SI field that is equivalent to that of Table 3. Tables 2, 3 and 4 are presented as alternate but equivalent formulations of the solution for the redefinition of the SI field for the 2-bits case.

The reassembly functionality should perform reassembly based on one of the descriptions disclosed herein. If the reassembly function is described such that it takes into account those definitions, the transmitter may optionally not require knowledge of what the SI field indicates. The receiver is responsible for assigning the right SI indication for every reordering PDU, such that the transmitter can perform reassembly correctly based on the value of the SI field.

The definitions described above can be used regardless of the definitions defined in the 3GPP specifications. For example, the SI structure can remain unchanged, but proprietary solutions take into account the correct setting of the SI as described above, such that the reassembly function may work correctly.

When SI is equivalent to "11," the reassembly procedure described above proceeds to discard SDUs that it should not be discarding. More specifically, when the received and stored MAC-ehs SDUs are not consecutive, both of the SDUs are discarded. This implies that all the remaining payload units in the received reordering PDUs are discarded and/or not processed correctly.

Figures 14, 15:
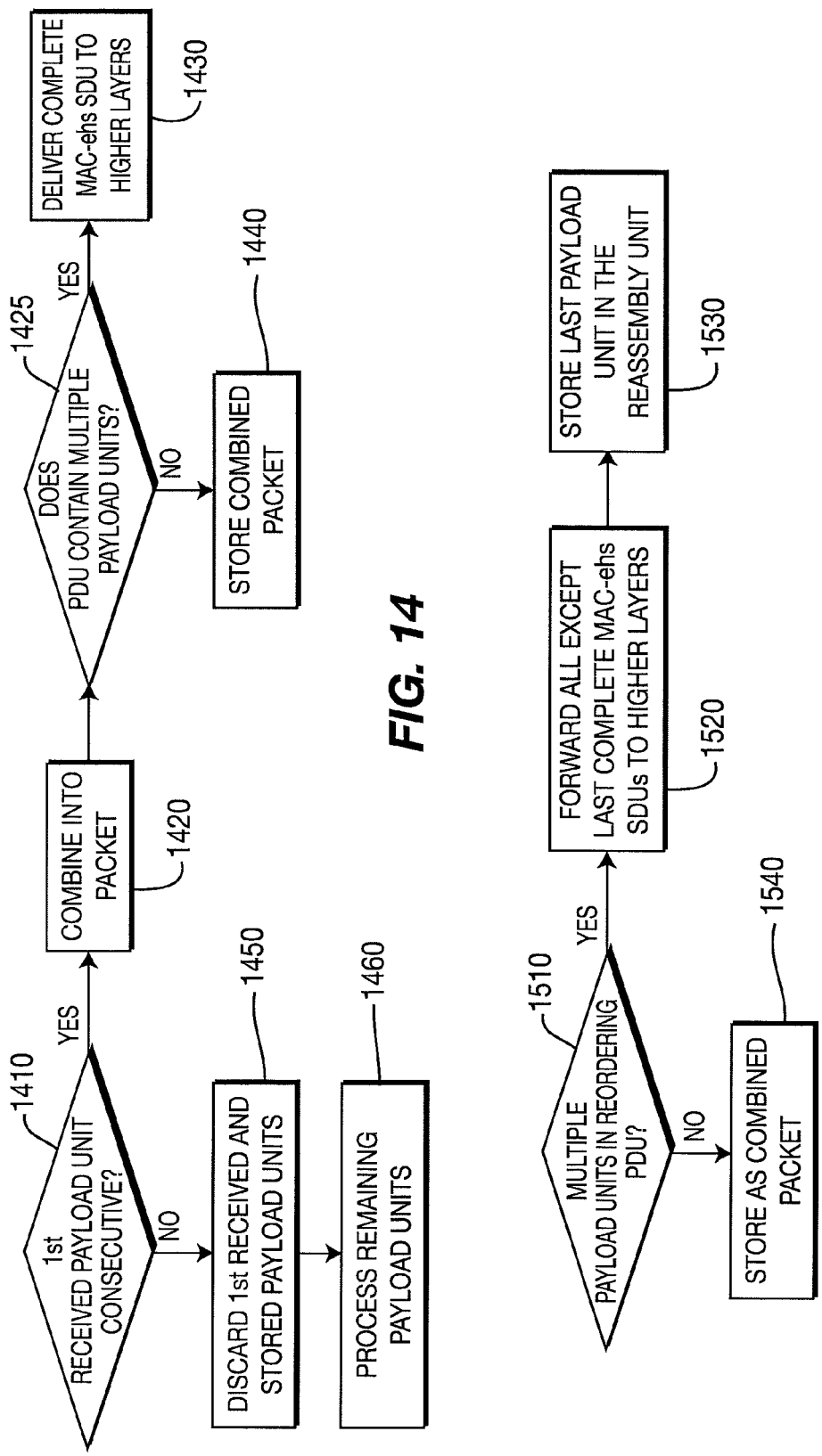
FIG. 14 is a flow diagram of how a reassembly unit may perform a combining function or a discarding function.
FIG. 15 is a flow diagram of how payload units should be processed if there are multiple reordering SDUs in the reordering PDU.

FIG. 14 is a flow diagram of how the reassembly unit may perform a combining function when SI is equivalent to "11," to avoid this issue. A determination of whether the first received and stored payload units are consecutive is made at 1410. The first received and stored payload unit should be combined if the payload units are consecutive at 1420. The combined packet should only be delivered to higher layers 1430 if the reordering PDU contains multiple payload units at 1425, since in that scenario the first payload unit corresponds to the last segment of the MAC-ehs SDU. Otherwise, if there is only one payload unit in the reordering PDU, the segment is a middle segment and thus the combined packet should be stored at 1440.

When SI is equivalent to "11," the reassembly unit may perform a discarding function as shown in FIG. 14. If the payload units are not consecutive at 1410, the stored payload unit and the first received payload unit (first segment in the reordering PDU or the only payload unit) should be discarded at 1450. All other payload units should be processed such that if there are multiple payload units in the reordering PDU at 1460.

Figure 16:
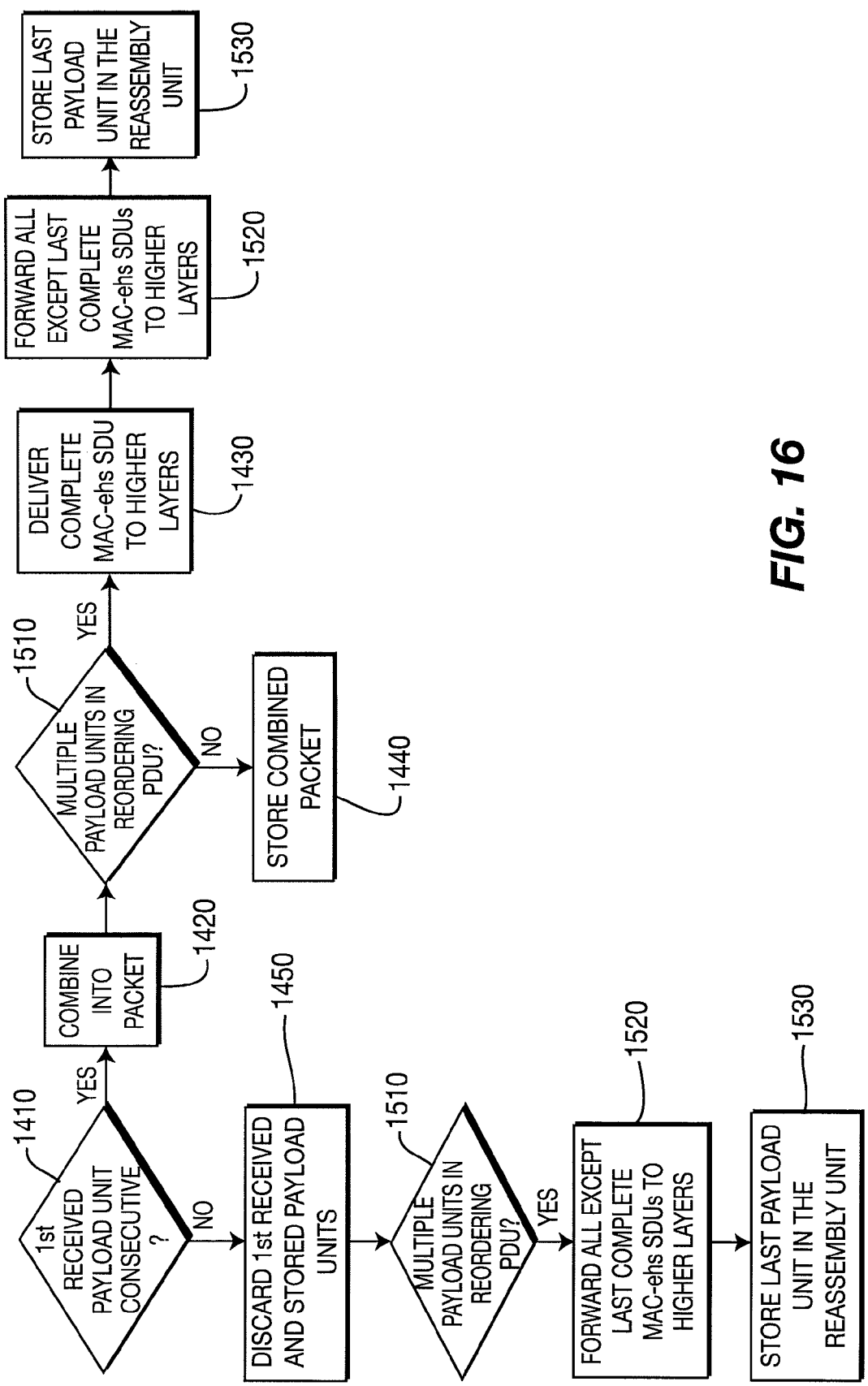
FIG. 16 is a flow diagram of the combined reassembly process shown in FIGS. 14 and 15.

FIG. 15 is a flow diagram of how the remaining payload units in 1460 of FIG. 14 are processed if there are multiple payload units in the reordering PDU. If there are multiple payload units in the reordering PDU at 1510, all but the last complete MAC-ehs SDUs must be forwarded to higher layers (or output entity) at 1520. Note that it is assumed that the first payload unit has already been combined or discarded. The last payload unit, which corresponds to the first segment of a SDU should be stored in the reassembly unit at 1530. If the PDU does not contain multiple payload units, the stored payload unit and the received payload unit are combined and stored. This is shown in FIG. 14 at 1440. FIG. 16 is a flow diagram of the combined reassembly process shown in FIGS. 14 and 15.

In order to reflect the definitions of SI and descriptions of the reassembly function described above, the reassembly unit functionality can possibly be updated in the following way. Note that the changes include the fact that the interpretation of the SI field need not be known, but that it might be optionally added to the description. The terms MAC-d and MAC-c PDUs are used interchangeably with MAC PDUs and MAC-ehs SDU, and MAC-ehs SDU is used interchangeably with payload units.

Figure 17:
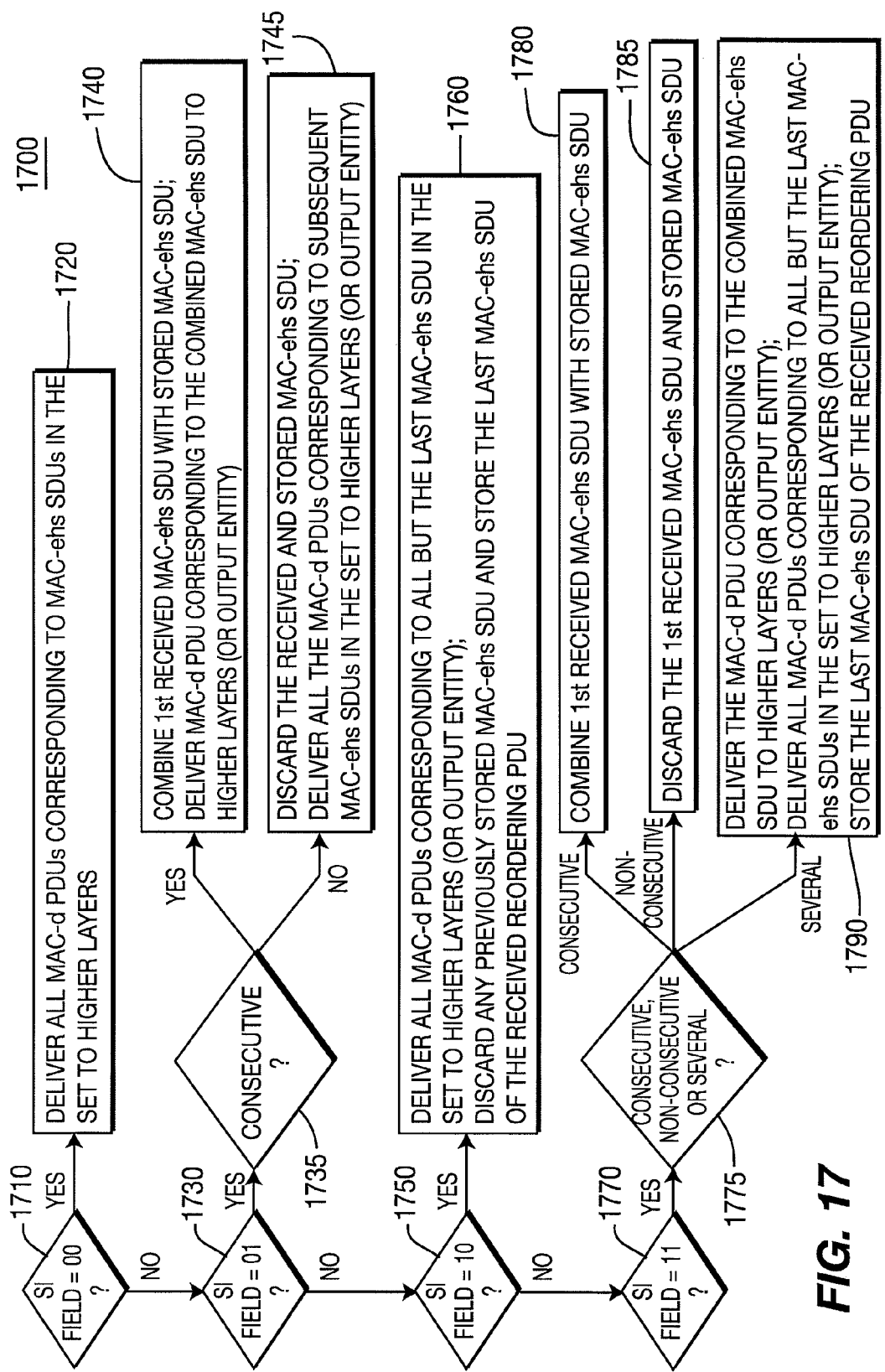
FIG. 17 is a flow diagram of how the reassembly unit processes the SI field associated with a reordering PDU.

FIG. 17 is a flow diagram of how the reassembly unit processes 1700 the SI field associated with a reordering PDU. If the SI field is set to "00" at 1710, all the MAC-d PDUs corresponding to MAC-ehs SDUs in the set are delivered to higher layers at 1720.

If the SI field is set to "01" at 1730, the determination of whether the received and stored MAC-ehs SDUs are consecutive is made at 1735. If the received and stored MAC-ehs SDUs are consecutive, the first received MAC-ehs SDU is combined with the stored MAC-ehs SDU and the MAC-d PDU corresponding to the combined MAC-ehs SDU is delivered to higher layers (or output entity) at 1740. If the received and stored MAC-ehs SDUs are not consecutive, the received and stored MAC-ehs SDU are discarded while all the MAC-d PDUs corresponding to subsequent MAC-ehs SDUs in the set are delivered to higher layers (or output entity) at 1745.

If the SI field is set to "10" at 1750, all the MAC-d PDUs corresponding to all but the last MAC-ehs SDU in the set are delivered to the higher layers (or output entity) and any previously stored MAC-ehs SDU is discarded while the last MAC-ehs SDU of the received reordering PDU is stored at 1760.

If the SI field is set to "11" at 1770, a determination of whether the received and stored MAC-ehs SDUs are consecutive can be made at 1775. If the received and stored MAC-ehs SDUs are consecutive, the first received MAC-ehs SDU is combined with the stored MAC-ehs SDU at 1780. If the received and stored MAC-ehs SDUs are not consecutive, the first received MAC-ehs SDU and the stored MAC-ehs SDU are discarded at 1785. If there are several MAC-ehs SDUs in the set, the MAC-d PDU corresponding to the combined MAC-ehs SDU is delivered to higher layers (or output entity), all the MAC-d PDUs corresponding to all but the last MAC-ehs SDU in the set are delivered to higher layers (or output entity), and the last MAC-ehs SDU of the received reordering PDU is stored at 1790. This procedure is essentially equivalent to the procedure described in [0054].

When a 1-bit SI field is used on a per-MAC-ehs payload unit basis, an encoding that would present the same advantage as the previous one is shown in Table 5. The following example, shown in Table 5, is a 1-bit SI, one SI for each SDU or SDU segment encoding. In this example, the bit indicates whether the payload unit is a start or middle segment of an SDU.

TABLE 5

| SI Field | Segmentation indication |
|---|---|
| 0 | The MAC-ehs payload unit is a complete MAC-ehs SDU or the last segment of a MAC-ehs SDU |
| 1 | The MAC-ehs payload unit is the first segment or a middle segment of a MAC-ehs SDU. |

It should be noted that the term "reordering PDU" may also be used in place of "MAC-ehs payload unit" in this case, since there would be a single MAC-ehs payload unit per reordering PDU.

Another embodiment shows how it is possible to omit including the LI field. As the size of this field could be significant (e.g., 11 bits for byte-aligned payload), its relative overhead could be significant in situations where the MAC-ehs PDU is not very large (e.g., less than 1000 bits).

The principle of this embodiment is to omit the LI for the last payload unit included in the MAC-ehs PDU if it is a segment of a SDU which is not the last segment (i.e., a start segment or a middle segment). The presence of a start or middle segment at the end of the payload implies that there is no padding. Hence, when processing the MAC-ehs PDU, the segment length to extract does not need to be indicated, as the end of the segment corresponds to the end of the MAC-ehs PDU.

Different methods can be used to indicate in the header if this situation applies and therefore, whether a LI is present or not. Method 1 describes an implicit indication of the presence of the LI field. In this method, no specific field is added to the header to indicate the presence or absence of the LI field. The segmentation indication (SI) relied on is applicable to the last priority queue or the last SDU as well as any other method or field to determine the end of the header.

The methods to indicate the end of the header can include adding a flag field (FQ or other) indicating if the header part is the last of the header. If this option is included in the method, the flag field would have to be present before the LI. Another alternative method would be to calculate the difference between the size of the MAC-ehs PDU and the sum of the lengths of the payload unit(s) decoded from the header thus far to determine whether the header is too small to accommodate an additional payload unit.

Method 2 describes an explicit indication of the presence of the LI field. In this method, a flag (Fli) is present after the logical channel identity to indicate whether a LI is present or not for the payload units that are from this logical channel.

The presence of this field could be defined on a logical channel basis and signaled by a higher layer. Alternatively, the presence of the field could be determined by a pre-determined rule relative to the nature of the logical channel. For instance, it could make sense to limit this field to logical channels to which a single fixed RLC PDU size apply (such as when it is used by an AM RLC instance with fixed RLC PDU size), or a set of fixed RLC PDU sizes apply (such as when it is used by an UM RLC instance with a set of fixed RLC PDU sizes).

The reason the above-mentioned rules would be useful is that the relative overhead of the LI in the case of a logical channel to which flexible RLC PDU sizes apply is typically very small, thus the omission of the length field is not necessary.

Although the features and elements are described in particular combinations, each feature or element can be used alone without the other features and elements or in various combinations with or without other features and elements.

The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for multiplexing service data units (SDUs) in a medium access control (MAC) protocol data unit (PDU) for transmission over a high speed-downlink shared channel (HS-DSCH), the method comprising:
   creating one or more reordering PDUs, each reordering PDU including one or more reordering SDUs, wherein a reordering SDU is a complete MAC enhanced high speed (MAC-ehs) SDU or a segment of a MAC-ehs SDU;
   creating a MAC-ehs header for the MAC PDU, the MAC-ehs header comprising:
      a logical channel indicator (LCID) field indicating a logical channel for each of the one or more reordering SDUs;
      a length indicator (LI) field indicating a length of each of the one or more reordering SDUs; and
      a segmentation indication (SI) field for each of the one or more reordering PDUs indicating:
         whether a first reordering SDU in the reordering PDU is a complete MAC-ehs SDU or a last segment of a MAC-ehs SDU, and
         whether a last reordering SDU in the reordering PDU is a complete MAC-ehs SDU or the first segment of a MAC-ehs SDU; and
   transmitting the MAC PDU.

2. The method of claim 1, wherein the one or more reordering PDUs include one or more segments of one or more MAC-ehs SDUs.

3. The method of claim 1, wherein if there is more than one reordering SDU in a reordering PDU, the SDUs belong to different logical channels.

4. The method of claim 1, wherein if there is more than one reordering SDU in a reordering PDU, the SDUs belong to different queues.

5. The method of claim 1, wherein the MAC-ehs header further includes one or more padding bits to maintain timing alignment.

6. The method of claim 1, wherein the MAC-ehs header further comprises:
   a transmission sequence number field indicating a data sequence number for each of the one or more reordering PDUs; and
   a flag field indicating a last reordering PDU for each of the one or more reordering PDUs.

7. A method for interpreting a segmentation indication (SI) field in a header of a medium access control (MAC) protocol data unit (PDU) transmitted over a high speed-downlink shared channel (HS-DSCH) the method comprising:
   receiving a value of the SI field in a MAC header, the SI field corresponding to a reordering PDU;
   determining whether there are more than one reordering service data units (SDUs) in the reordering PDU; and
   interpreting the value of the SI field based on whether there are more than one reordering SDUs in the reordering PDU,
   wherein the SI field having a value of "00" indicates that a first reordering SDU of the reordering PDU is a complete MAC enhanced high speed (MAC-ehs) SDU and a last reordering SDU of the reordering PDU is a complete MAC-ehs SDU,
   wherein the SI field having a value of "01" indicates that the first reordering SDU of the reordering PDU is a last segment of a MAC-ehs SDU and, if there are more than one reordering SDUs in the reordering PDU, the last reordering SDU of the reordering PDU is a complete MAC-ehs SDU,
   wherein the SI field having a value of "10" indicates that the last reordering SDU is a first segment of a MAC-ehs SDU and, if there are more than one reordering SDUs in the reordering PDU, the first reordering SDU of the reordering PDU is a complete MAC-ehs SDU, and
   wherein the SI field having a value of "11" indicates that, if there is only one reordering SDU in the reordering PDU, the one reordering SDU is a middle segment of a MAC-ehs SDU, and if there are more than one reordering SDUs in the reordering PDU, the first reordering SDU of the reordering PDU is a last segment of a MAC-ehs SDU and the last reordering SDU of the reordering PDU is a first segment of a MAC-ehs SDU.

8. The method of claim 7, further comprising performing disassembly of the MAC PDU based on the interpretation of the value of the SI field.

9. A wireless transmit/receive unit (WTRU), the WTRU comprising:
   a medium access control enhanced high speed (MAC-ehs) disassembly unit configured to disassemble a first reordering protocol data unit (PDU) into one or more reordering service data units (SDUs) using a MAC-ehs header, wherein the MAC-ehs header comprises a logical channel indicator (LCID) field, a length indicator (LI) field, and a segmentation indication (SI) field, wherein the SI field is repeated per reordering PDU, and indicates whether a first and a last of the one or more reordering SDUs in the first reordering PDU are segmented;
   a MAC-ehs reassembly unit configured to reassemble a second reordering PDU using the SI field in the MAC-ehs header; and a MAC-ehs demultiplexing unit configured to deliver the second reordering PDU to a logical channel using the LCID field in the MAC-ehs header.

10. The WTRU of claim 9, wherein the MAC-ehs reassembly unit is further configured to deliver the reassembled second reordering PDU to the MAC-ehs demultiplexing unit.

11. The WTRU of claim 9, wherein the MAC-ehs reassembly unit is further configured to reassemble the second reordering PDU using a SDU or a segment of a SDU stored in the MAC-ehs reassembly unit when the stored SDU or the segment of the SDU and one or more disassembled SDUs have consecutive transmission sequence number field values.

12. The WTRU of claim 11, wherein the SDU or the segment of the SDU stored in the MAC-ehs reassembly unit is not associated with the first reordering PDU.

13. The WTRU of claim 9, wherein the MAC-ehs reassembly unit is further configured to discard any SDUs stored in the MAC-ehs reassembly unit.

14. The WTRU of claim 9, wherein the MAC-ehs reassembly unit is further configured to discard any SDUs stored in the MAC-ehs reassembly unit when any stored SDUs and one or more disassembled SDUs do not have consecutive transmission sequence number field values.

15. The WTRU of claim 9, wherein the MAC-ehs reassembly unit is further configured to reassemble the second reordering PDU using one or more SDUs or segments of SDUs after a first SDU in the first reordering PDU and before a last SDU in the first reordering PDU.

16. The WTRU of claim 9, wherein the second reordering PDU comprises all SDUs except for a last SDU in the first reordering PDU.

17. The WTRU of claim 9, wherein the MAC-ehs header further comprises:

a transmission sequence number field indicating a data sequence number for each of the reordering PDUs; and a flag field indicating a last reordering PDU for each of the reordering PDUs.

* * * * *